United States Patent
Smith

(10) Patent No.: US 7,023,167 B2
(45) Date of Patent: Apr. 4, 2006

(54) CONTROL ARRANGEMENT FOR AN INDUCTION MOTOR COMPRESSOR HAVING AT LEAST THREE WINDINGS, A TORQUE-AUGMENTATION CIRCUIT A STARTING CAPACITOR AND A RESISTIVE ELEMENT

(76) Inventor: Otto J. M. Smith, 612 Euclid Ave., Berkeley, CA (US) 94708-1332

( * ) Notice: Subject to any disclaimer, the term of this patent is extended or adjusted under 35 U.S.C. 154(b) by 107 days.

(21) Appl. No.: 10/137,760

(22) Filed: May 2, 2002

(65) Prior Publication Data
US 2003/0206804 A1 Nov. 6, 2003

(51) Int. Cl.
*H02P 1/24* (2006.01)

(52) U.S. Cl. .................. 318/727; 417/45; 417/44.2; 417/44.1; 318/797; 318/778; 318/779; 318/781; 318/794

(58) Field of Classification Search ............... 417/45, 417/44.1, 44.2; 318/727, 778, 779, 781–783, 318/786, 794, 795, 797
See application file for complete search history.

(56) References Cited

U.S. PATENT DOCUMENTS

| | | | | |
|---|---|---|---|---|
| 3,851,232 A | | 11/1974 | Chirgwin | |
| 4,201,517 A | * | 5/1980 | Ferguson | 417/12 |
| 4,295,792 A | * | 10/1981 | Tachibana et al. | 417/15 |
| 4,642,545 A | * | 2/1987 | Lewus | 318/749 |
| 4,792,740 A | * | 12/1988 | Smith | 318/768 |
| 4,846,635 A | * | 7/1989 | Fry et al. | 417/410.1 |
| 5,177,972 A | * | 1/1993 | Sillato et al. | 62/205 |
| 5,300,870 A | * | 4/1994 | Smith | 318/768 |
| 5,545,965 A | | 8/1996 | Smith | |
| 5,760,493 A | | 6/1998 | Outcalt et al. | |
| 5,969,497 A | * | 10/1999 | McDonald et al. | 318/778 |
| 6,025,693 A | * | 2/2000 | Smith | 318/768 |
| 6,049,188 A | * | 4/2000 | Smith | 318/786 |
| 6,113,357 A | * | 9/2000 | Dobbs | 417/244 |
| 6,142,741 A | * | 11/2000 | Nishihata et al. | 417/32 |
| 6,356,041 B1 | * | 3/2002 | Smith | 318/34 |
| 6,490,158 B1 | * | 12/2002 | Ellyson et al. | 361/690 |
| 6,733,251 B1 | * | 5/2004 | Sakurabayashi et al. | 417/360 |

* cited by examiner

Primary Examiner—Timothy S. Thorpe
Assistant Examiner—Emmanuel Sayoc
(74) Attorney, Agent, or Firm—Dorsey & Whitney LLP

(57) ABSTRACT

Apparatus for driving a three-phase compressor assembly from a single-phase electrical power supply having first and second power lines, said three-phase compressor assembly comprising a compressor having a rotatable shaft, an electrical motor having a rotatable shaft coupled to the rotatable shaft of the compressor, the electrical motor having at least first, second and third motor windings and having at least first, second and third terminals connected to the first, second and third windings, means adapted to connect the first and second power lines of the single-phase power supply to the first and second terminals and a torque augmentation circuit for injecting current into the third terminal and including a capacitor and an electrical component in series with the capacitor, said electrical component having resistive characteristics and having means for essentially interrupting the current being injected into the third terminal.

7 Claims, 14 Drawing Sheets

US 7,023,167 B2
1

CONTROL ARRANGEMENT FOR AN INDUCTION MOTOR COMPRESSOR HAVING AT LEAST THREE WINDINGS, A TORQUE-AUGMENTATION CIRCUIT A STARTING CAPACITOR AND A RESISTIVE ELEMENT

The present invention is directed to an apparatus and method for driving a three-phase compressor assembly from a single-phase electrical power supply and more particularly to the starting and running of such a three-phase compressor assembly from such a supply.

BACKGROUND OF THE INVENTION

Three-phase air-conditioner compressors are utilized because they have high efficiency. When a single-phase electrical power supply is all that is available for driving such a three-phase compressor, it has been necessary to utilize auxiliary equipment such as starting timers, contactors, and capacitors. Such auxiliary equipment is expensive and adds considerable weight. Single-phase motors heretofore utilized typically are provided with a main winding and a quadrature winding. The quadrature winding has connected to it start and run capacitors. The phase angle of the current in a quadrature winding (lagging the voltage drop in the quadrature winding) due to these capacitors is usually in the range of 60 degrees to 80 degrees lagging but typically can not go beyond 85 degrees lagging. At these small lagging phase angles, a much larger current is required. Also when opening an electrical power switch on a single-phase motor, a high back pressure in some cases can occur, causing the compressor to act like a gas motor and to spin in the backwards direction, with gas flowing from the outlet port to the inlet port. If the motor is re-energized during this state as a single-phase motor, it may continue to run at full speed in the backwards direction, which is very undesirable. To prevent such an occurrence, a reverse-direction lock-out relay is often installed, so that the electrical power can not be applied to the motor when the shaft is running backwards. There is therefore a need for a new and improved apparatus and method for driving a three-phase compressor from a single-phase electrical power supply which overcomes these difficulties.

OBJECTS AND SUMMARY OF THE INVENTION

In general it is an object of the present invention to provide a three-phase compressor from a single-phase electrical power supply with improved starting torque capabilities.

Another object of the invention is to provide a compressor assembly of the above character in which an improved power factor is achieved on the single-phase power supply.

Another object of the invention is to provide a compressor assembly of the above character in which improved efficiency is achieved from a single-phase power supply.

In general the apparatus for driving a three-phase compressor assembly from a single-phase electrical power supply having first and second power lines in which the three-phase compressor assembly is comprised of a compressor for use with a gas source and for delivering compressed gas to a gas receiver and having a rotatable shaft and an electrical motor having a rotatable shaft coupled to the rotatable shaft of the compressor. The electrical motor has at least first, second and third motor windings and having at least first, second and third terminals connected to the first, second and third windings. The first and second power lines of the single-phase power supply are connected to the first and second terminals. A torque augmentation circuit for injecting current into the third terminal includes a capacitor and an electrical component in series with the capacitor. The electrical component has resistive characteristics and has means for essentially interrupting the current being injected into the third terminal.

Additional objects and features of the invention will appear in connection with the description of the invention in connection with the accompanying drawings.

DESCRIPTION OF THE PREFERRED EMBODIMENTS

Figure 1:
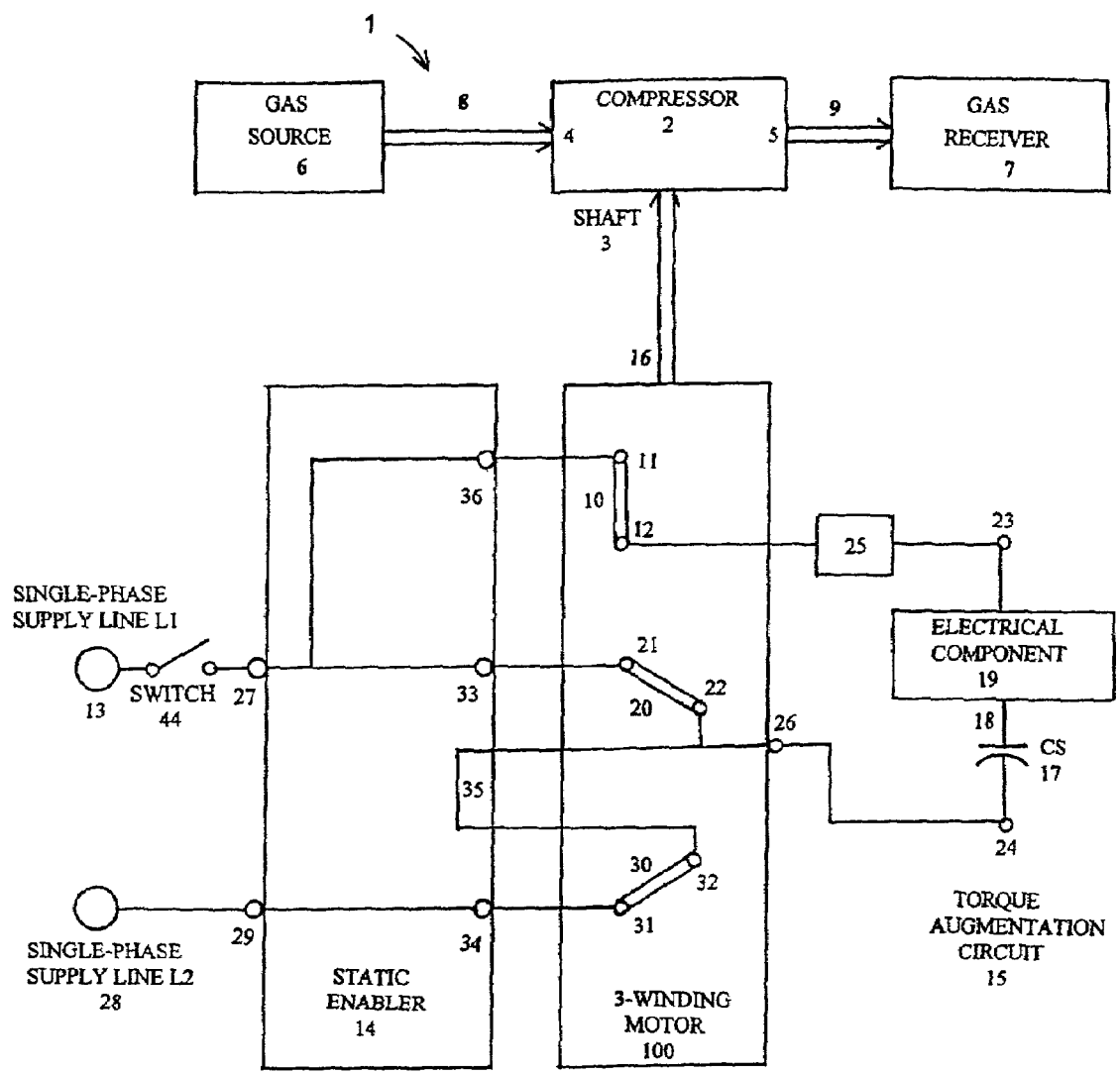
FIG. 1 is a block diagram of a compressor assembly incorporating the present invention which includes a compressor and a three-winding motor for driving the compressor.

More in detail, the apparatus and method for driving a three-phase compressor assembly from a single-phase electrical power supply as shown in FIG. 1 consists of an apparatus 1. The apparatus 1 comprises a compressor 2 which is provided with an input power shaft 3, an input gas port 4, and a high-pressure exhaust or output port 5. When the shaft 3 is rotating, the compressor 2 sucks gas from gas source 6 and supplies the gas at a higher pressure into a gas receiver 7 through the use of a pipe 8 from the gas source 6 to the compressor 2 and a pipe 9 from the compressor 2 to the gas receiver 7. The compressor 2 can be either a reciprocating type with pistons, or a rotating scroll type run at approximately constant speed. The gas source 6 can be an evaporator as for example in an air conditioner, heat pump, or refrigerator. The gas receiver 7 can be the condenser in an air conditioner, heat pump or a refrigerator. Alternatively, the gas source 6 can be the atmosphere and the gas receiver 7 can be a tank of compressed air used for any number of purposes as for example for operating pneumatic tools for a contractor.

The compressor 2 forms a part of the compressor assembly which includes a three-winding electrical induction motor 100 which has a rotating shaft 16 coupled to the shaft 3 of the compressor 2. The motor 3 has at least three electrical windings 10, 20 and 30 which can be called respectively the driven, middle and end windings or alternatively the D, M and T windings, respectively of at least three different phases. Winding 10 is provided with first and second terminals 11 and 12, winding 20 is provided with first and second terminals 21 and 22, and winding 30 is provided with first and second terminals 31 and 32.

A static enabler 14 and a torque augmentation circuit 15 are provided as a part of the apparatus 1 and are connected to the motor 100 of the compressor assembly. The static enabler 14 provides connections between the windings 10, 20 and 30. As shown, it provides a connection 35 between terminals 22 and 32. The static enabler 14 also provides a connection as shown between terminal 11 and terminal 21 through terminals 36 and 33.

The single-phase power supply to be utilized in supplying power to the apparatus 1 of the present invention is provided with supply lines L1 and L2. The supply line L1 also designated as 13 is connected through a switch 44 to a power terminal 27 which is connected to a terminal 33. The second single-phase supply line L2 also denoted as 28 is connected to terminal 29 and to a terminal 34 and thence to the winding terminal 31.

The torque augmentation circuit 15 which also can be identified as a starting torque augmentation circuit has a starting terminal 24 connected to motor winding terminal 22 and to an external circuit 26. A second starting terminal 23 is connected through a switch 25 to motor winding terminal 12. The starting torque augmentation circuit 15 is a series electrical circuit connected between terminals 23 and 24 and consists of a starting capacitor 17 connected in series by a wire 18 to an electrical component 19 that has an ambient-temperature ohmic resistance RS. The RS can be in the range of 200 ohms to 5000 ohms as for example for use with a 0.2-ton refrigeration compressor. The ambient-temperature resistance RS can be in the range of from 3 ohms to 80 ohms for a 10-ton compressor and in the range of from 0.3 ohms to 8 ohms for a 100-ton compressor. For the electrical component 19 it has been found to be very desirable to utilize a positive temperature coefficient (PTC) thermistor to provide the desired resistance RS for reasons hereinafter explained.

Operation of the apparatus shown in FIG. 1 may now be briefly described as follows. The circuitry for energizing the motor 100 is accomplished by closing switch 44. With switch 25 closed, the torque augmentation circuit 15 injects a locked-rotor current or an initial transient starting current $I_d$ into at least one winding as for example winding 10 to terminal 12 through terminal 23 and switch 25. The winding 10 which also can be called the first, driven or D winding has the initial transient starting current $I_d$ injected thereinto.

The reactance of the capacitor CS for 60 hertz in ohms is given by $X_c$ where $X_c=1/(377(CS))$ where (CS) is in farads.

This ambient-temperature resistance RS in series with this reactance $-j\,X_c$ of the capacitor CS yields the impedance $Z_s$ of the series circuit between 23 and 24.

$$Z_s=\{(RS)^2+(X_c)^2\}^{0.5}$$

The phase angle of this impedance is negative and is $\Phi$ equals $$\Phi=-a\,\tan(X_c/(RS))$$

The voltage across the circuit from terminals 24 to 23 is lagging the supply voltage from the single phase power supply lines L1 and L2 by approximately 60 degrees. The voltage across the torque augmentation circuit 15 in FIG. 1 is roughly the same magnitude as the applied single-phase voltage. The initial starting current at zero time or locked rotor current into terminal 12 of $I_d$ is the voltage divided by the impedance. For an applied voltage near 230 volts 60 hertz and a voltage from 24 to 23 of 230 volts, the current is approximately $$|I_d|=230/Z_s.$$

This current in winding 10 is lagging the voltage drop from terminals 12 to 11 in winding 10 by approximately $\Theta$ degrees, where $\Theta$ is always positive, and where $\Theta$ equals $$\Theta=150-|\Phi|$$

Since $\Phi$ is negative, $$\Theta=150+\Phi.$$

The initial starting torque as a function of the angle $\Theta$ can be measured and it is desirable for this angle to be between 80 degrees lagging and 150 degrees lagging.

The magnitudes of the RS resistance in ohms and the capacitance CS in farads are selected to accomplish a $\Theta$ in the range of 80 to 150 degrees, or a $\Phi$ in the range of 10 to 80 degrees for this circuit 15, to provide a practical utilization of the current $I_d$.

The magnitudes of the RS resistance in ohms and the capacitance CS in farads are selected to accomplish a current $I_d$ that is sufficient to start driving the motor shaft 16 and compressor shaft 3 when the initial pressure in the gas receiver 7 is low or negligible. A smaller RS or a larger CS can be selected so that it is sufficient to start the motor and compressor when the initial pressure in the gas receiver 7 is maximum and a large starting torque is needed.

The motor for a compressor with maximum pressure in the gas receiver 7 can be electrically turned off by opening the switch 44. In some cases, the high back pressure may cause the compressor to act like a gas motor, and to spin in the opposite direction, with gas flowing from port 5 to port 4. The magnitudes of the RS resistance in ohms and the capacitance CS in farads can be selected to accomplish a current $I_d$ sufficient to stop the negative rotation of the motor and compressor shaft and sufficient to start the motor and compressor shaft turning in the desired direction and speed it up to the desired load speed. During the electricity-off interval, while the compressor is accelerating in the negative direction, the PTC is cooling off, so that at the instant of reenergization the PTC temperature is "slightly warm" or low or ambient, and this positively influences the available starting torque at the instant of reenergization.

In the apparatus and method taught by FIG. 1, windings 20 and 30 are in series across the single-phase power source and can be considered analogous to a conventional single-phase motor main winding which is across the single-phase power source. In FIG. 1, winding 10 can be considered to be analogous to a conventional single-phase motor quadrature winding which has only one terminal connected to the power source. With this circuit in FIG. 1, the angle of the current lagging the voltage in winding 10 is greater than 60 degrees, and can easily be greater than 90 degrees, with a maximum limit of 150 degrees. Angles greater than 90 degrees, and particularly in the vicinity of 120 degrees, are superior for providing a high torque-to-current ratio for starting a motor.

In the apparatus of FIG. 1, no reverse-direction relay is necessary, and consequently the cost of this relay component is saved. The apparatus in FIG. 1 can operate as a single-phase motor, with the direction of rotation being determined by the torque augmentation circuit 15. There is no run capacitor in this circuit, and none is needed, depending upon the power ratings of the 3-winding motor and the compressor.

If desired, the switch 25 can be a contactor responsive to a time-delay relay, so that the contacts of switch 25 are closed initially so that when the switch 44 is closed, and the contacts of switch 25 open after a preselected time interval determined by the time delay relay, the current $I_d$ in the torque augmentation circuit 15 and in the winding 10 is reduced when the shaft speed approaches the load speed.

The electrical component 19 can be a two-terminal semiconductor device which has an equivalent resistance RS between the two terminals. This semiconductor device can be connected and disconnected by the switch 25. Alternatively, this semiconductor device can be responsive to a time-delay relay, so that the initial resistance RS can be changed after a preselected time interval to a much higher resistance, reducing the current $I_d$ in the torque augmentation circuit and in the winding 10 after the shaft is up to load speed.

The electrical component 19 as hereinbefore explained can be a positive temperature coefficient (PTC) thermistor which has an ambient-temperature resistance RS and which heats up due to the current $I_d$ so that the resistance rises transiently as a function of the higher temperature and in the steady-state becomes very large, reducing the current $I_d$ in the torque augmentation circuit 15 and in the winding 10 to perform the function of the switch 25, and thereby can eliminate the need for the switch 25.

Both starting capacitors and PTC thermistors are readily available commercially at low cost. The apparatus in FIG. 1 eliminates an expensive time-delay relay and starting contactor typically used. PTC thermistors are available from Keystone Thermometrics in values from 5 ohms to 1500 ohms or these applications. The voltage ratings are from 50 volts ac to 480 volts ac. The steady-state final value of voltage from terminal 26 to terminal 12 is used for the selection of the thermistor voltage. Electrolytic A-C motor starting capacitors are available from many companies. For 125 vac, they range from 88 mfd to 1200 mfd. For 250 vac, they range from 43 mfd to 324 mfd. For 330 vac, they range from 53 mfd to 227 mfd. Values both larger and smaller are available on special order.

Figure 2:
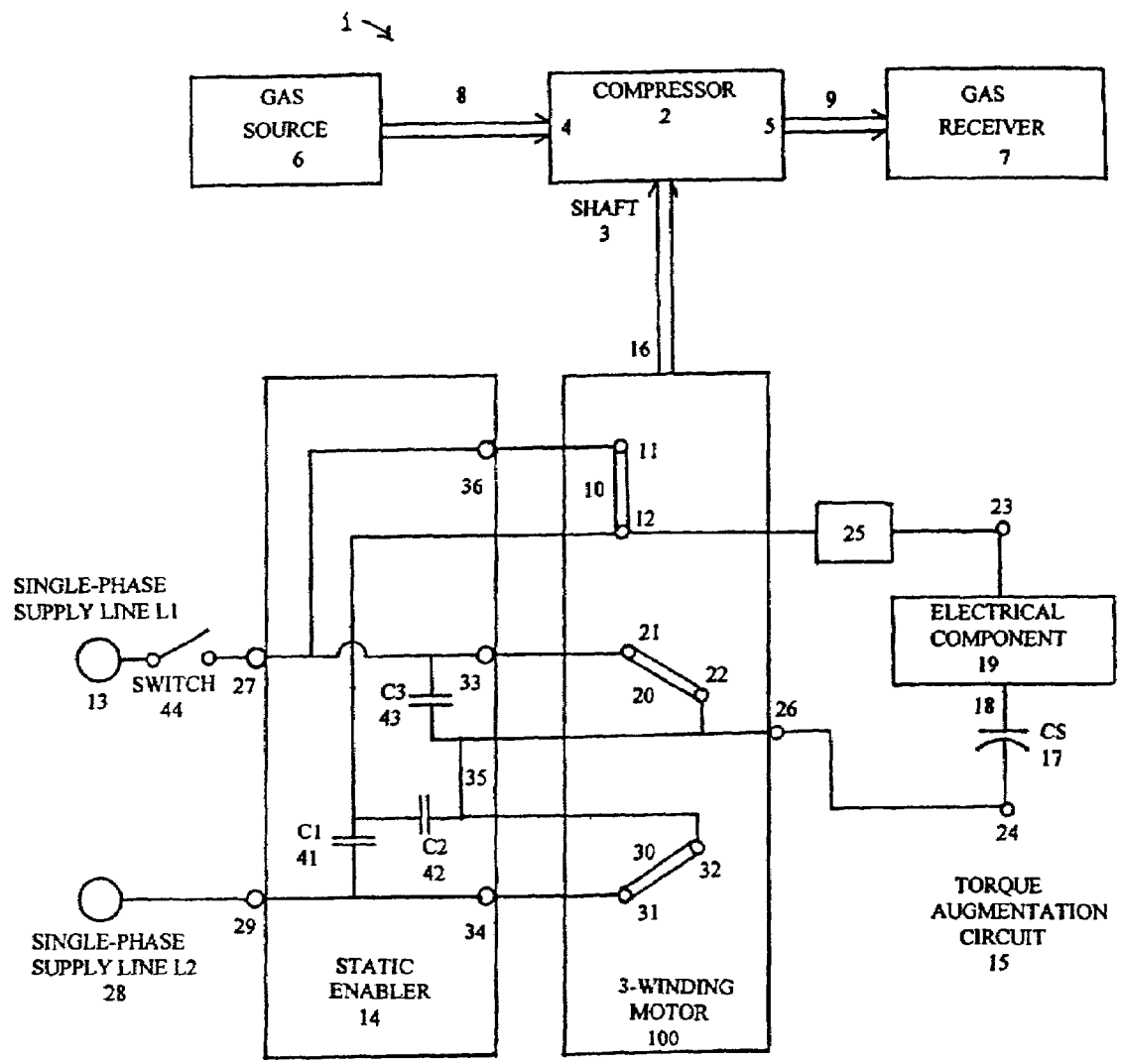
FIG. 2 is a block diagram similar to FIG. 1 but showing a semi-hex connection with run capacitors.

FIG. 2 is a block diagram of apparatus incorporating the present invention similar to that shown in FIG. 1 but which in addition is provided with run capacitors. Thus, as shown in FIG. 2, a run capacitor 41 also denoted C1 is connected between the supply terminal 29 and the motor terminal 12 for the drive winding 10. A run capacitor 42 also denoted C2 is connected between the winding end terminal 32 of winding 30 and the motor terminal 12 for the drive winding 10. A run capacitor 43 also denoted C3 is connected between the supply terminal 27 and the motor winding end terminal 22 for the middle winding 20.

The capacitor 41 injects a current component into the driven winding 10 which lags the voltage across that winding by 30 degrees, and has a power-factor with respect to that voltage of 87%. The capacitor 42 injects a current component into the driven winding 10 which lags the voltage across that winding by 60 degrees, and has a power-factor with respect to that voltage of 50%. The sum of these two current components in the driven winding 10 is a composite current of magnitude approximately equal to the full-load three-phase line current and with a power-factor approximately equal to the full-load three-phase line power-factor.

The voltage across capacitor C3 is the same as one winding voltage, which is the line voltage divided by 1.732. In the case of a 230-volt motor, it is approximately 133 volts. Capacitor C3 has a microfarad capacity of double the value for capacitor C1, and the value of the voltage across it is half of that for capacitor C1, so the current in capacitor C3 has the same magnitude as the current in capacitor C1. Its phasor polarity is opposite to that of the current in capacitor C1. The sum of the capacitor C2 current and the capacitor C3 current equals the sum of the winding 20 current at terminal 22 and the winding 30 current at terminal 32. This sum magnitude is approximately equal to the full-load three-phase line current.

When the shaft power is full load, these three capacitors C1, C2 and C3 inject currents so that the magnitudes of the three winding currents are equal and have the same power factor in each winding.

When the motor 100 is large and has a three-phase full-load power-factor of lagging 86.6%, the capacitive vars of the three run capacitors C1, C2 and C3 is double the magnitude of the magnetizing vars of the motor, and the single-phase line current in FIG. 2 has a power-factor of 86.6% leading, which is desirable for good power quality, and for minimum voltage sag between no load and full load. Thus, the three motor run capacitors C1, C2 and C3 provide single-phase line current which has a desirable leading power-factor.

In summary FIGS. 1 and 2 have each provided apparatus for driving a three-phase compressor assembly (2 and 100) from a single-phase electrical supply having first 28 and second 13 power lines, said three-phase compressor assembly comprising a compressor 2 for use with a gas source 6 and for delivering compressed gas to a gas receiver 7 and having a rotatable shaft 3, an electrical motor 100 having a rotatable shaft 16 coupled to the rotatable shaft of the compressor, the electrical motor having at least first 30, second 20, and third 10 motor windings and having at least first 31, second 21 and third 12 terminals connected to the first, second and third windings, means adapted to connect the first 28 and second 13 power lines of the single-phase power supply to the first and second terminals and a torque augmentation circuit 15 for injecting current into the third terminal 12 and including a capacitor 17 and an electrical component 19 in series with the capacitor, said electrical component having resistive characteristics and having means for essentially interrupting the current being injected into the third terminal 12.

Figure 3:
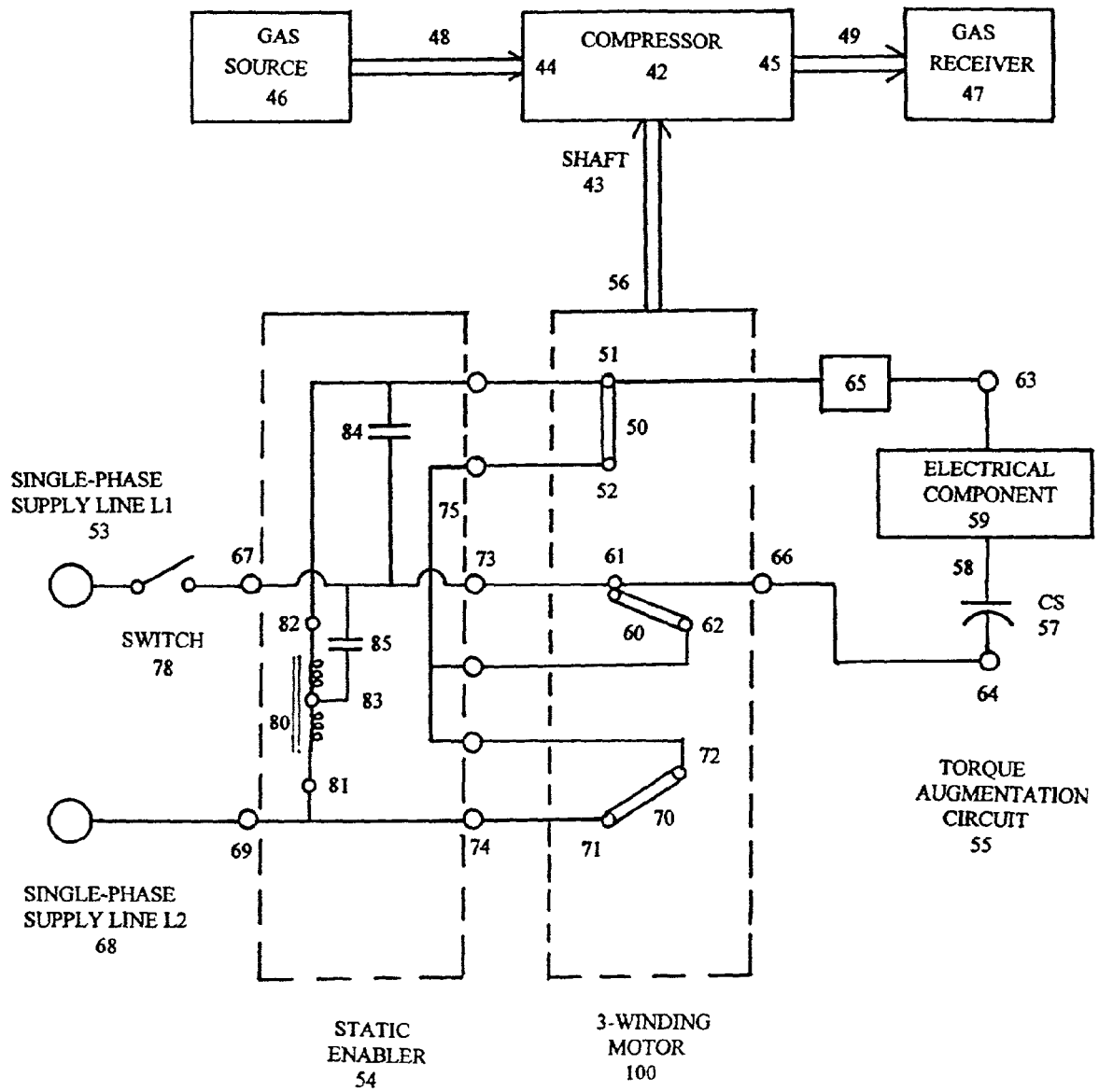
FIG. 3 is a block diagram of another embodiment of the present invention similar to that shown in FIG. 2 but showing a wye-connected three-winding motor.

FIG. 3 is a block diagram of apparatus for a wye-connected motor incorporated in the present invention similar to that shown in FIG. 1. The compressor 42 like the compressor 2 in FIG. 1 has an input power shaft 43, an input gas port 44, and a high-pressure exhaust or output port 45. When the shaft 43 is rotating, the compressor sucks gas from the gas source 46 through the pipe 48 into the port 44. The gas is delivered at higher pressure into the output port 45, and through a pipe 49 into a gas receiver 47.

A three-winding induction motor 100 has a rotating shaft 56 and three electrical windings of different phases. Phase winding 50 has first and second terminals 51 and 52. Phase winding 60 has first and second terminals 61 and 62. Phase winding 70 has first and second terminals 71 and 72.

The static enabler 54 provides the connections between the windings. The enabler provides a connection 75 between terminals 52, 62, and 72. This is the conventional "center" or "neutral" of a conventional wye connnection.

The single-phase supply line L1 denoted 53 is connected by a switch 78 to a power terminal 67, to which a connection is also made from terminals 73, 61, and 66. A second single-phase supply line L2 denoted 68 is connected to terminal 69 and through the enabler to terminal 74 and thence to winding terminal 71.

The torque augmentation circuit 55 is provided with a starting terminal 64 connected to motor winding terminal 61 and an external terminal 66. A second starting terminal 63 is connected through a switch 65 to motor winding terminal 51. The series electrical circuit between 63 and 64 consists of a starting capacitor 57 connected by wire 58 to an electrical component 59 which has an ambient-temperature ohmic resistance RS of the same type as electrical component 19 in FIG. 1.

A first motor run capacitor 84 is connected between motor winding terminal 51 of the driven winding 50 and the power supply terminal 67. The current in 84 and into the driven or D winding has a 50% power-factor with respect to the driven or D winding voltage.

An autotransformer 80 has winding terminals 81 and 82, and a winding tap 83 intermediate between these two winding terminals 81 and 82. Terminal 81 is connected to supply terminal 69 and winding terminal 71. Transformer terminal 82 is connected to the terminal 51 of the driven or D winding 50. A second motor run capacitor 85 is connected between the power supply terminal 67 and the transformer terminal 83. The current through capacitor 85 divides at the tap, and part flows to terminal 81 and the remainder flows to terminal 82 and into the driven or D winding 50. This winding component has an 87% power-factor with respect to the driven or D winding voltage.

On circuit energization by closing the switch 78, and with switch 65 closed, the torque-augmentation circuit 55 injects into terminal 51 of the motor driven or D winding 50 a locked-rotor current or an initial transient starting current component. The first current component injected into this winding 50 from terminals 63 through 65 into terminal 51 can be identified as $I_d$.

The reactance of the CS capacitor 57 for 60 hertz in ohms is given by $X_c$ where $X_c=1/(377(CS))$, where (CS) is in farads.

This ambient-temperature resistance RS of the electrical component 59 in series with this reactance $-j\,X_c$ of the capacitor CS yields the impedance $Z_s$ of the series circuit between 63 and 64.

$$Z_s=\{(RS)^2+(X_c)^2\}^{0.5}$$

The phase angle of this impedance is negative and is $\Phi$ equals $$\Phi=-a\tan(X_c/(RS)).$$

The voltage across the circuit from terminals 64 to 63 is lagging the supply voltage by approximately 60 degrees. The voltage across the torque augmentation circuit 55 in FIG. 3 is roughly the same magnitude as the applied single-phase voltage. The initial starting current at zero time or locked rotor current into terminal 51 of $I_d$ is the voltage divided by the series impedance $Z_s$. For an applied voltage near 230 volts 60 hertz from terminals 67 to 69, and a voltage from terminals 64 to 63 of 230 volts lagging 60 degrees, the current is approximately $$|I_d|230/Z_s.$$

This first current component injected into winding 50 is lagging the voltage drop from terminals 52 to 51 in winding 50 by approximately $\Theta$ degrees, where $\Theta$ is always positive, and where $\Theta$ equals $$\Theta=150-|\Phi|$$

Since $\Phi$ is negative, $$\Theta=150+\Phi.$$

The run capacitor 84 injects a second current component into the driven winding 50 both during acceleration and during normal running at full speed which second current component lags the voltage across that winding 50 by 60 degrees, and has a power factor with respect to that voltage of 50%.

The run capacitor 85 injects a special current into the tap 83 of the autotransformer 80. The voltage from terminals 67 to 83 lags the supply voltage phase from terminals 67 to 69 by approximately 30 degrees. The special current (IC85) in this capacitor 85 leads the power supply voltage phase by approximately 60 degrees. This special current (IC85) splits into two portions, one portion flowing through a first transformer section from terminals 83 to 81 and into terminal 69, and the other portion flowing through a second transformer section from terminals 83 to 82. The ratio of these two current portions is determined by the ampere-turns in the first section of the winding equal to the ampere-turns in the second section of the winding. Typically, if the tap 83 is near the center of the winding, and the two sections have equal number of turns, the current from terminal 83 to terminal 82 will be approximately one half of the special current (IS85) and will lead the supply voltage phase by 60 degrees. The current portion from terminal 83 to terminal 82 is a third current component flowing into the motor terminal 51 of the driven winding 50 both during acceleration and during normal running at full speed during which said component lags the voltage across that winding by 30 degrees, and has a power-factor with respect to that voltage of 87%.

During normal running, the current in winding 50 injected through terminal 51 is the sum of the above second current component lagging 60 degrees with a power-factor of 50% with respect to that winding and the above third current component lagging 30 degrees with a power-factor of 87% with respect to that winding. The sum of these two current components in winding 50 and the resulting composite power-factor is chosen with respect to the motor full-load line current and full-load power-factor. Often, the full-load current in winding 50 is chosen to be the motor name-plate current. However, this sum current and power-factor can be made to be significantly different from the name-plate values if desired. For example, if this sum is less than the name-plate current, the motor maximum efficiency might occur at less than full load.

In general, the capacitive leading volt-amperes-reactive vars of the two capacitors 84 and 85 are much larger in magnitude than the magnetizing lagging vars of the motor, 1.732 (V I) {sin [a cos (PF)]}, so that the supply line vars, which is the difference, is leading power factor, not lagging as in the motor. Thus, it can be seen that with two motor run capacitors 84 and 85, the single-phase line current has a leading power-factor.

The sum of the second and third current components into driven winding 50 can have a phase angle lagging the voltage by 45 degrees. The locked-rotor or starting current $I_d$ on balanced three-phase voltages has a much larger phase lag, and can be as great as 75 degrees. The first initial starting current component $I_d$ has a phase lag of $\Theta$ which when added to the run currents with phase lag of 45 degrees, yields a composite phase lag near 75 degrees. $\Theta$, therefore must be much larger, between 80 degrees and 150 degrees lagging the winding 50 voltage.

The magnitudes of the resistance RS ohms and the CS capacitance 57 in farads are selected to accomplish a $\Theta$ in the range of 80 to 150 degrees, or a $\Phi$ in the range of 10 to 80 degrees, for a practical utilization of the current $I_d$.

The magnitudes of the resistance RS ohms and the capacitance CS in farads are selected to provide a current $I_d$ sufficient to start the turning motor shaft 56 and compressor shaft 43 when the initial pressure in the gas receiver 47 is low or negligible. A smaller RS or a larger CS can be selected which is sufficient to start the motor and compressor when the initial pressure in the gas receiver 47 is maximum and a large starting torque is required.

The motor for the compressor 42 with a maximum pressure in the gas receiver 47 can be electrically turned off by opening the switch 78. In some cases, the high back pressure may cause the compressor 42 to act like a gas motor, and to spin in the opposite direction, with gas flowing from port 45 to port 44. The magnitudes of the ambient-temperature resistance RS ohms and the capacitance CS in farads can be selected to provide a current $I_d$ sufficient to stop the negative rotation of the motor and compressor shaft and also sufficient to start the motor and compressor shaft turning in the desired direction and to speed it up to the desired load speed. During the electricity-off interval, while the compressor 42 is accelerating in the negative direction, the electrical component 59 is cooling off, so that at the instant of reenergization the electrical component 59 temperature is "slightly warm" or low or ambient, and thereby influences the available starting torque at the instant of reenergization.

Figure 4:
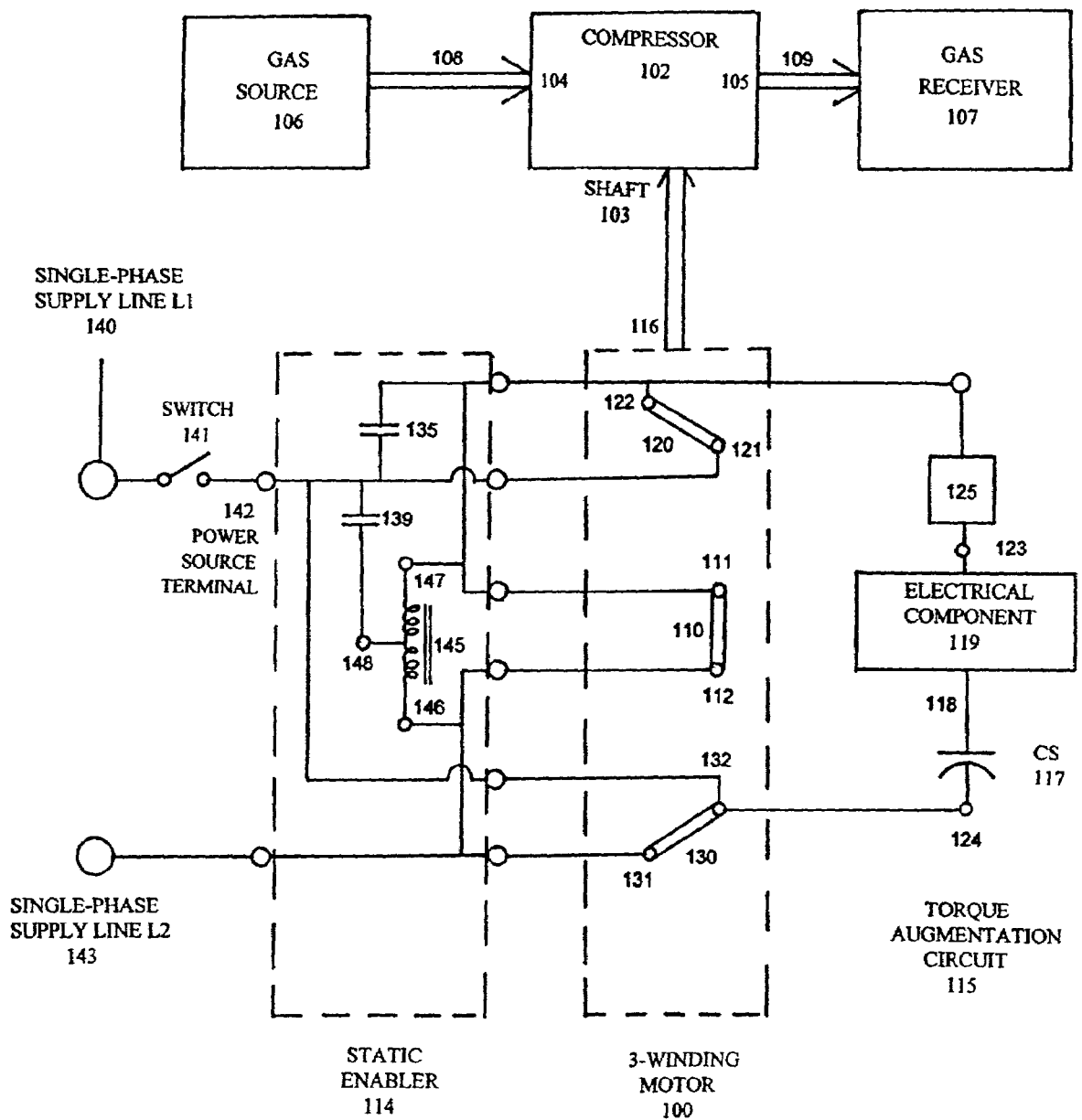
FIG. 4 is a block diagram similar to FIGS. 2 and 3 but showing a delta-connected three-winding motor.

FIG. 4 is a block diagram of apparatus incorporating the present invention similar to that shown in FIG. 3 for a delta-connected three-winding motor. The compressor 102 like compressor 42 has a rotatable shaft 103, an inlet suction port 104, an outlet pressure port 105, a gas source 106 and a gas receiver 107. A single-phase electrical source is provided with two supply lines 140 and 143. An electrical induction motor 100 is provided with three motor windings 110, 120, 130 of different phases, each motor winding having a first and a second terminal 111, 112, 121, 122, 131, 132, respectively. Piping 108 connects the gas source 106 to the inlet suction port 104, Piping 109 connects the outlet pressure port 105 to the gas receiver 107. The rotatable shaft 103 is driven by the shaft 116 of the induction motor 100.

The torque augmentation circuit 115 consists of a starting capacitor 117 connected in series by a conductor 118 to an electrical component 119 with conductance or resistance. A first starting terminal 123 is provided between the electrical component 119 and an electrically-conductive element 125. A second starting terminal 124 is connected to a motor terminal 132. The electrically-conductive switch 125 connects the first starting terminal 123 to a first terminal 111 of a motor driven winding 110.

The static enabler 114 contains the interconnections of the motor windings. A second terminal 112 of the first or driven motor winding 110 is connected to the first terminal 131 of a third motor winding 130, and the second terminal 132 of the third motor winding 130 is connected to the first terminal 121 of a second or middle motor winding 120. The second terminal 122 of the second motor winding 120 is connected to the first terminal 111 of the first motor winding. These connections in sequence 111, 112, 131, 132, 121, 122, and back to 111 form a closed delta connection of the motor windings.

The delta "corners" or the "line" terminals are identified by the winding terminal pairs at each corner. The power line terminal 142 is connected to the delta corner (121, 132). The power line terminal 143 is connected to the delta corner (112, 131). The injection terminal 124 is connected to the power supply terminal 142 and to the delta corner (121, 132). The injection terminal 123 is connected through element 125 to the delta corner (111, 122), which can be called the "Driven" corner, because it is not connected to either of the power supply lines.

Using this notation, the first starting terminal 123 is connected to the delta corner (111, 122). The second starting terminal 124 is connected to terminal 132 of motor winding 130, which is other than the first motor winding. This is the delta corner (121, 132). The first supply line 140 is connected through a switch 141, which can energize the power source terminal 142. This power source terminal 142 is connected to the first terminal 121 of the second winding 120, and also the second terminal 132 of the third winding 130. This is the delta corner (121, 132). The second supply line 143 is connected to the first terminal 131 of the third winding 130, and also to the second terminal 112 of the first winding 110. This is the delta corner (112, 131). A first run capacitor 135 is connected between the power source terminal 142 and the delta terminal (111, 122), which is the "Driven" terminal.

On circuit energization by closing the switch 141, and with switch 125 closed, the current from 142 and delta corner (121, 132) flows through the capacitor 117 in the torque-augmentation circuit 115, thence through 119 and 125 into the delta corner (111, 122) which is the "Driven" terminal. This is the first injected current component $I_d$ and one of the injected current components into the delta corner (111, 122).

A second current component is the current through capacitor 135. This also is injected into the delta corner (111, 122). This second current component can be considered to be a 50% power-factor current with respect to the phasor voltage from the "Driven" terminal to a fictitious center neutral of the delta. The first injected current component has a power-factor near zero percent, and can be adjusted in the range between plus 10% and minus 50%.

With capacitors 117 and 135, the motor 100 can be started and can run at near name-plate speed. The motor shaft can deliver approximately two-thirds rated power continuously. The in-phase component of the current in the delta corner (111, 122), however, is insufficient for a shaft load up to the full nameplate power rating of the motor. A third injected current component is needed with an 87% power-factor into the Driven delta corner (111, 122), to provide more in-phase component of the current and more shaft torque.

In FIG. 4 there is also provided an autotransformer 145 with a winding that has a first terminal 146, a second terminal 147, and a winding tap 148 intermediate between the two terminals 146 and 147. Terminal 146 is connected to the supply line 143. A run capacitor 139 is connected between the power source terminal 142 and the winding tap 148. Terminal 147 is connected to the Driven delta corner (111, 122). When the supply reference voltage of 230 volts from terminals 142 to 143 has a zero phasor angle, the full voltage across the winding from terminals 146 to 147 is approximately 230 volts lagging 120 degrees. The tap 148 is at approximately the mid-point of the winding, so that the voltage from terminals 146 to 148 is approximately 115 volts lagging 120 degrees; the voltage from terminals 148 to 147 is approximately 115 volts lagging 120 degrees; and the voltage from terminals 142 to 148 is approximately 200 volts lagging 30 degrees. This 200 volts across the capacitor 139 causes a capacitive current to flow whose phasor angle leads the voltage from terminals 142 to 148 by 90 degrees, and this phasor current leads the reference voltage by 60 degrees. This current splits at the tap, and equal halves flow through two winding sections. The part flowing from 148 through 147 into the delta corner (111, 122) is the third injected current component into the delta corner (111, 122). This third injected current component with respect to the phasor voltage from delta corner (111, 122) to the fictitious center neutral of the delta has a power-factor of 87%. This can contribute a substantial part of the desired shaft torque.

With the two run capacitors 139 and 135, the injected current can be equal to the motor rated nameplate current at the motor rated full-load power-factor. With these capacitors and full rated shaft power, the individual motor windings will have balanced currents and balanced voltages.

Returning to the starting condition, the second and third injected currents from capacitor 135 and winding 148–147 will be present during starting. The first injected current id from the torque augmentation circuit 115 can be chosen to satisfy the starting needs. This current can be chosen to have a minus 86% power factor. The magnitude of this current $I_d$ can be chosen sufficient to start rotation of the motor shaft 116 and the compressor shaft 103 when the gas receiver 107 pressure is low or a minimum. For a more severe condition, a larger capacitor 117 and a lower resistance RS can be chosen to supply sufficient torque to start the motor shaft 116 and compressor shaft 103 when the gas receiver 107 pressure is a maximum.

The most severe condition is when the switch 141 has been opened, the motor 100 deenergized, and the gas pressure from 107 drives the compressor 102 backwards at a substantial negative velocity. A large capacitor 117 and a low resistance RS can be chosen to supply sufficient torque to stop the shaft negative velocity and to accelerate the motor and compressor inertia in the forward direction to bring the speed up to the normal full-load running speed. During the electricity-off interval, while the compressor is accelerating in the negative direction, the electrical component 119 is cooling off, so that at the instant of reenergization the electrical component temperature is "slightly warm" or low or ambient to influence the available starting torque at the instant of reenergization.

The above apparatus eliminates the need for a reverse-rotation lock-out relay as often used in conventional single-phase compressors, to prevent acceleration in the negative direction on reclosure and thereby reduces the cost and complexity of driving a compressor from a single-phase motor.

Figure 5A:
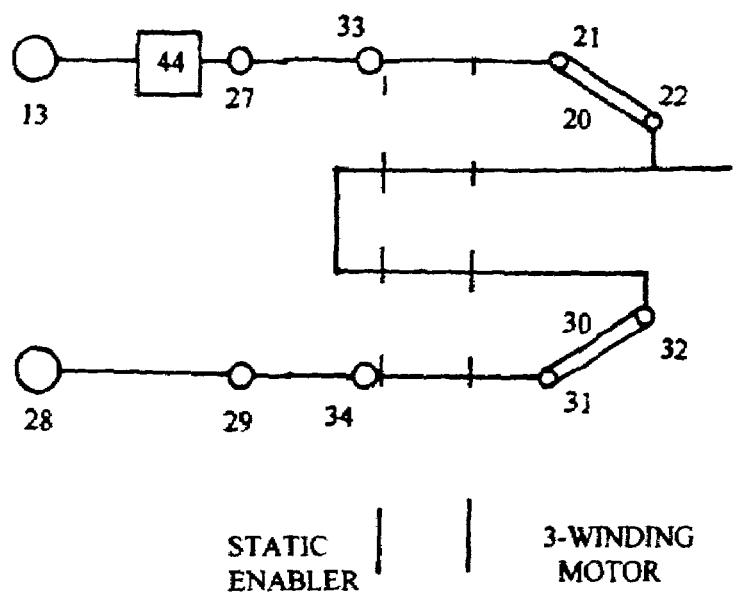
FIG. 5A is a circuit diagram showing a portion of the block diagram in FIG. 2 showing the connections for a predetermined voltage phase sequence.

FIG. 5A is a block diagram of apparatus showing a modification of the apparatus shown in FIG. 1 to accomplish reversing the shaft direction of rotation if desired. FIG. 5A shows a portion of the circuit of FIG. 1 with the single-phase power line terminals 13 and 28. Terminal 13 is connected to one pole of a 2-pole switch 44, and the other pole of this switch is connected to terminals 27, 33, and terminal 21 of winding 20. Terminal 28 is connected to terminals 29, 34, and terminal 31 of winding 30. This connection results in a voltage phase sequence of the windings 10-20-30.

Figure 5B:
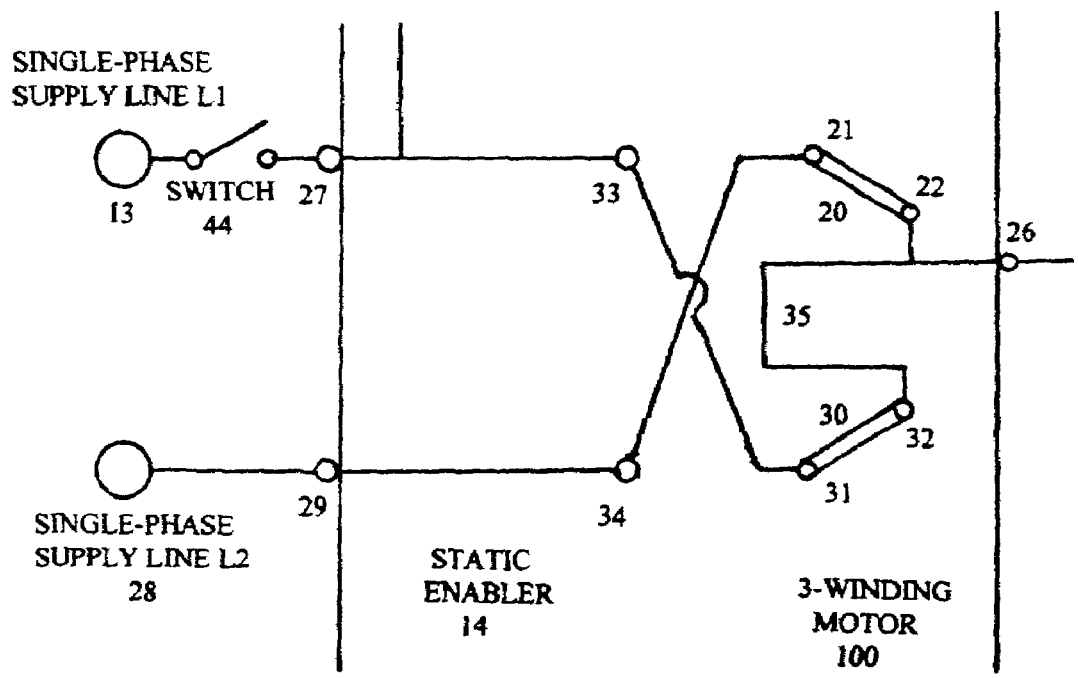
FIG. 5B is a circuit diagram similar to the diagram in FIG. 5A but showing the connection for a different predetermined sequence from that shown in FIG. 5A and showing a reversed phase sequence for reversed rotation.

To reverse the shaft direction of rotation, the voltage phase sequence of the windings must be changed to 30-20-10. FIG. 5B shows the circuit to accomplish this. In FIG. 5A, the connection from 33 to 21 is removed, and the connection from 34 to 31 is removed. In FIG. 5B, a new connection is made from 33 to 31, and a new connection is made from 34 to 21. This now has the voltage phase sequence 30-20-10. The currents in the windings 20 and 30 have been reversed with the current in winding 10 unchanged.

Figure 6:
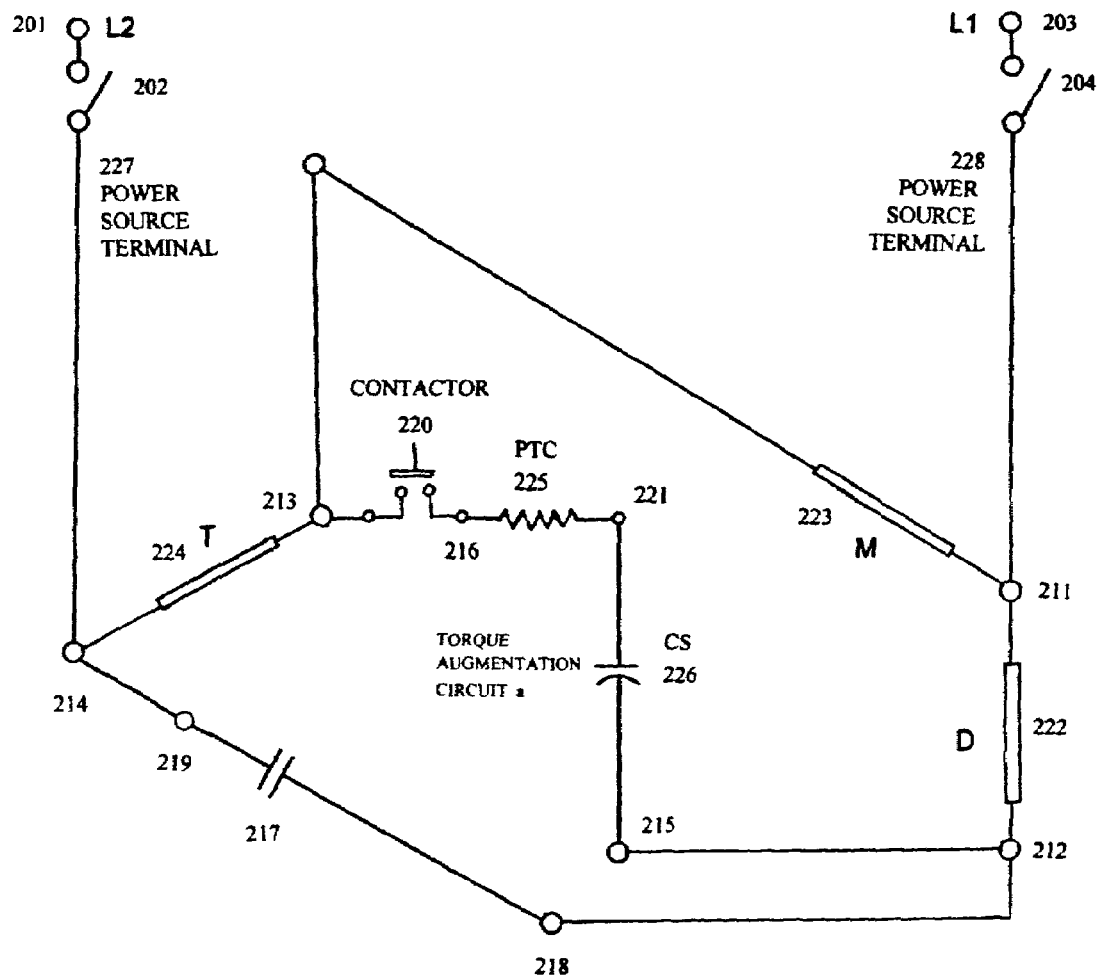
FIG. 6 is a circuit diagram showing a modification of a portion of the apparatus shown in FIG. 1 showing the use of a positive temperature coefficient thermistor controlled insertion and removal of a starting capacitor in a semi-hex connection of a three-winding motor operated from a single-phase supply.

FIG. 6 shows a circuit which is a modification of the circuit shown in FIG. 1 with one of the run capacitors from FIG. 2 added. For analysis, consider that there is no run capacitor. The rotatable machine has a rotor which can be either a cage rotor or a wound rotor. The rotor windings are magnetically coupled across the air-gap to all three of the stator windings.

The notation and the correspondence from FIG. 1 without the capacitor 217 from FIG. 2 is

TABLE 1 A

| FIG. 6 | FIG. 1 |
|---|---|
| 201 | 13 |
| 202 | 44 |
| 203 | 28 |
| 227 | 27 |
| 228 | 29 |
| 211 | 27 |
| 214 | 31 |
| 213 | 26 |
| 220 | 25 |
| 225 | 19 |
| 226 | 17 |
| D 222 | 10 |
| M 223 | 20 |
| T 224 | 30 |

The torque augmentation circuit "a" is the series circuit of elements 215, 226, 221, 225, 216 and 220 to 213 with terminals 215 and 213. This also can be called the "A series" circuit when it is connected between winding terminals 213 and 215. The winding connection is the three windings D 222 in series with M 223 and T 224, with the winding terminals in sequence being 212, 211, 213, and 214. The power source terminal 228 is connected to the winding terminal 211. The power source terminal 227 is connected to the winding terminal 214.

The performance of this apparatus is as follows. When the power lines apply a line voltage from 227 to 228, this reference voltage at zero phase angle is impressed across winding terminals 214 to 211, and a current lagging this reference voltage flows through the T winding 224 and through the M winding 223. This locked-rotor current induces a rotating current and rotating voltage in the machine rotor windings, and this rotating flux in the machine air-gap induces a voltage in the stator D winding 222. This induced voltage in D winding 222 from 212 to 211 leads in phase with respect to the reference voltage. Stated differently, this induced voltage in D winding 222 from 211 to 212 lags in phase with respect to the reference voltage. The resultant locked-rotor voltage from winding terminal 213 to winding terminal 212 lags the reference voltage. This resultant voltage is impressed across the circuit from 216 through the PTC 225 to the intermediate terminal 221 through CS capacitor 226 to terminal 215 and terminal 212 of winding D. The resulting current which flows through the PTC 225 and CS capacitor 226 can have a phase angle with respect to the reference between plus 30 degrees and minus 60 degrees. This resultant current is injected into terminal 212 and winding D.

The composite effect of this resultant current in D and the applied current in T and M is a torque sufficient to start the rotor shaft turning, and can accelerate the rotor shaft up to normal full speed. The machine operates as a single-phase motor with no run capacitor.

During acceleration, the current through the PTC thermistor 225 produces resistive thermal losses, and these heat up the thermistor. The characteristic of this thermistor is that the heat increases the temperature of the thermistor, which in turn increases the resistance, and the thermistor resistance goes to a very high value in a fraction of a second. The steady-state running condition of the thermistor is a resistance in the kilo-ohm range, a current less than one ampere, and a few watts loss. At normal full speed, this increase in PTC 225 resistance is equivalent to opening a switch, like the contactor 220 shown, to the CS starting capacitor 226, so that the voltage across the PTC 225 thermistor is essentially equal to the applied voltage between 213 and 212, and the voltage across the CS starting capacitor 226 is almost zero.

In the state described above, with no run capacitor 217, at full speed, there is negligible current in D winding 222, and the machine is running as a single-phase motor with windings T and M in series as the only energized windings. The available shaft torque is less than the usual motor rated torque. The torque augmentation circuit, however, can start the three-winding motor on a single-phase source.

FIG. 6 is the circuit of FIG. 1 with one of the run capacitors from FIG. 2 added. One motor-run capacitor 217 has terminals 218 and 219. Terminal 218 is connected to 212. Terminal 219 is connected to 214. The new D winding 222 is the winding 10 in FIG. 1. The new M winding 223 is the winding 20 in FIG. 1. The new T winding 224 is the winding 30 in FIG. 1. The new capacitor 217 is the C1 capacitor 41 in FIG. 2. The Table IB below shows these relations:

TABLE 1 B

| FIG. 6 | FIG. 1 |
| --- | --- |
| 225 | PTC 19 |
| 226 | CS 17 |
| D 222 | 10 |
| M 223 | 20 |
| T 224 | 30 |
| 217 | 41 in FIG. 2. |

The arrangement on the page of FIG. 6 is convenient in which the phasor angles of the voltages of each component are parallel to the line drawing of that component, which is different than in FIG. 1.

The PTC 225 in FIG. 6 performs two functions. When it is at ambient-temperature, it has the resistance of RS ohms. When supply switches 202 and 204 and contacts 220 are closed, the PTC heats up in a fraction of a second, and its high resistance opens the circuit, equivalent to opening the contacts 220 in FIG. 6. This eliminates the need for a time-delay contactor or a centrifugal switch to remove the starting capacitor as the shaft approaches full-load speed.

At the locked-rotor zero-speed initial state when the circuit is energized, the applied voltage from 214 to 211 is the line voltage with a phasor angle defined as the reference at zero degrees. The phasor voltage across D winding 222 from 212 to 211 has a phasor angle of approximately plus 90 degrees, and a magnitude of approximately 58% of the applied voltage. The phasor voltage from 213 to 215 is approximately equal to the line voltage, at a phasor angle of minus 60 degrees. The impedance of the series circuit of PTC 225 in series with the CS capacitor 226 has a lagging impedance angle which can be between 40 and 60 degrees. The current in this series circuit is voltage near minus 60 degrees divided by impedance between minus 40 and minus 60 degrees and this impedance has a phasor angle between minus 20 degrees and zero degrees. This current component injected into D winding 222 at terminal 212 lags the winding voltage from 212 to 211 by between 110 degrees and approximately 90 degrees. With respect to D winding 222, this starting current component has zero power-factor.

The voltage phasor from 214 to 218 lags the reference voltage by approximately 30 degrees. The current in the run capacitor 217 leads this voltage by 90 degrees, and has a phasor angle of plus 60 degrees. This current is another injected current into terminal 212 of D winding 222. This second injected current in D winding 222 lags the winding voltage by approximately 30 degrees. This is an 87% power-factor current component. The sum of the first injected current near zero degrees and the second injected current at plus 30 degrees can be a composite starting current of 15 degrees or less, closely approximating the locked-rotor three-phase starting angle.

Figure 7:
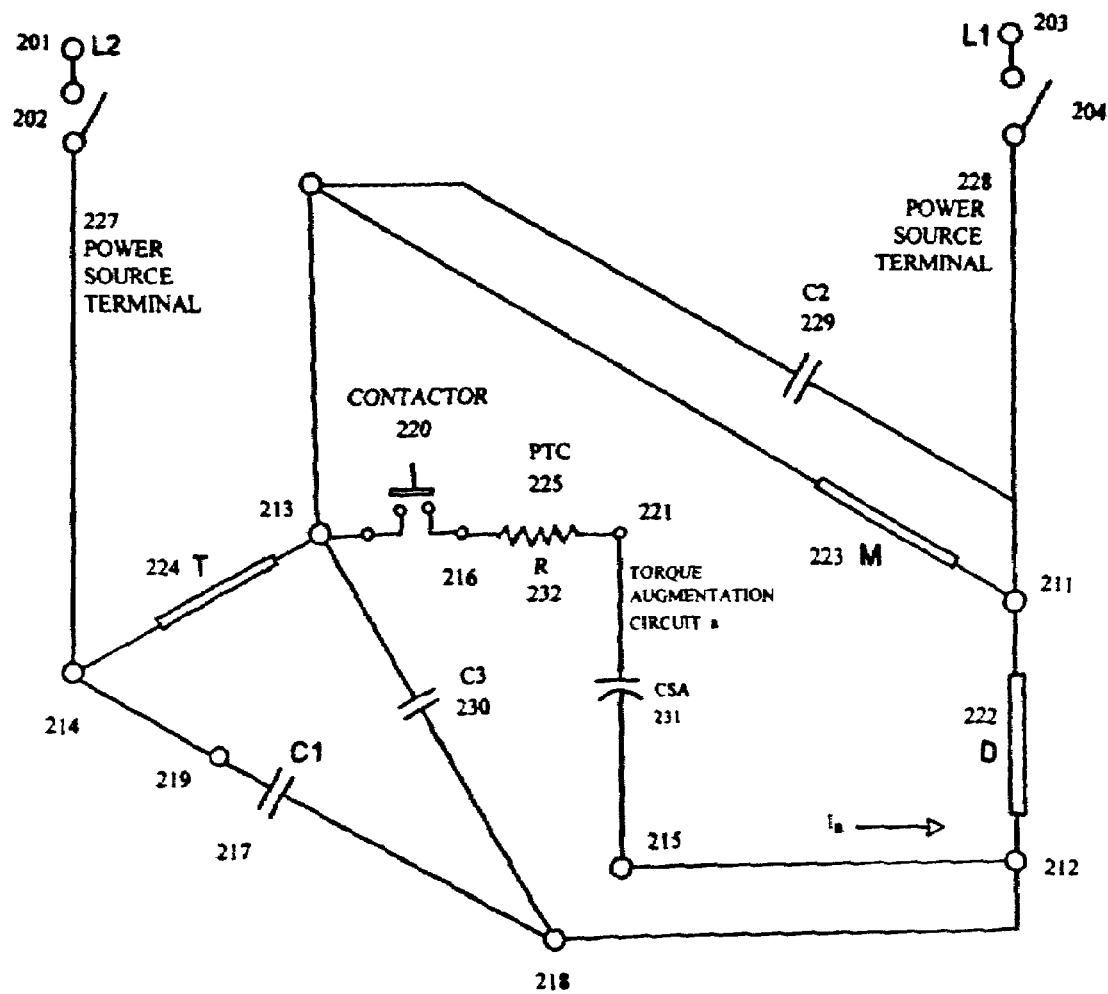
FIG. 7 is a circuit diagram similar to FIG. 6 but including run capacitors.

FIG. 7 is a circuit similar to that shown in FIG. 6 with the addition of two run capacitors 42 and 43 from FIG. 2. FIG. 7 is shown as the locked-rotor or initial starting state of FIG. 2. In FIG. 7, the single-phase power supply 201 and 203 is connected through two switches 202 and 204 respectively to power supply terminals 227 and 228. Terminal 227 is connected to terminal 214. Terminal 228 is connected to terminal 211. Run capacitor 229 is connected between 228 and 213. Run capacitor 230 is connected between terminals 218 and 213.

For purposes of analysis, the CSA starting capacitor is shown as CSA 231 connected between terminals 215 and 221 and is a loss-less polypropylene capacitor. The ambient temperature PTC 225 is shown as an ambient-temperature fixed resistance R 232 connected between terminals 221 and 216.

In FIG. 7, the winding terminals are 212, 211, 213, and 214. The SA contactor 220 can be a manual switch or an electromagnetic relay. The R resistor 232 is a constant resistance of magnitude R ohms, representing an ambient-temperature thermistor as in initial starting in FIG. 2. The series circuit of 215, 231, 221, 232, 216 and 220 to 213 with terminals 215 and 213 is called the "A series" circuit. This analysis is for the locked-rotor, zero speed, initial state immediately after the power-supply switches 202 and 204 and switch SA 220 are closed.

The run capacitors connected might not alone provide sufficient torque for the shaft of the motor to start turning. The purpose of the "A series" circuit is to provide an augmented current into the 212 terminal of the D winding 222 between terminals 212 and 211, which additional current Ia can augment the shaft torque of the motor.

The phasor voltage from 227 to 228 is the reference voltage. The phasor voltage drop from terminal 212 to 211 across the D winding 222 is leading the reference voltage by approximately 90 degrees. The phasor voltage from terminal 213 to terminal 215 is approximately lagging the reference voltage by 60 degrees. When the switch 220 is closed, this lagging phasor voltage is impressed across the "A series" circuit and causes the additional current $I_a$ component to flow into terminal 212 and through the D winding 222 from 212 to 211. Depending upon the ohmic value of the R resistance 232 and the capacitance of the CSA capacitor 231, the phasor of the additional current Ia component can be either leading or lagging. What is desired is a phasor composite current angle between plus 10 degrees and minus 40 degrees because the locked-rotor current in the D winding 222 normally lags the winding voltage by about 75 degrees, at a power factor near 26%. The run capacitors 217 and 230 are injecting into winding D a much higher power factor with a lag angle from the winding voltage between 30 and 60 degrees. Current $I_a$ needs to lag the D winding voltage by 80 to 150 degrees, so that the sum of this current and those from capacitors 217 and 230 in the D winding 222 approaches the normal lag angle of near 75 degrees from the winding voltage.

Figure 8:
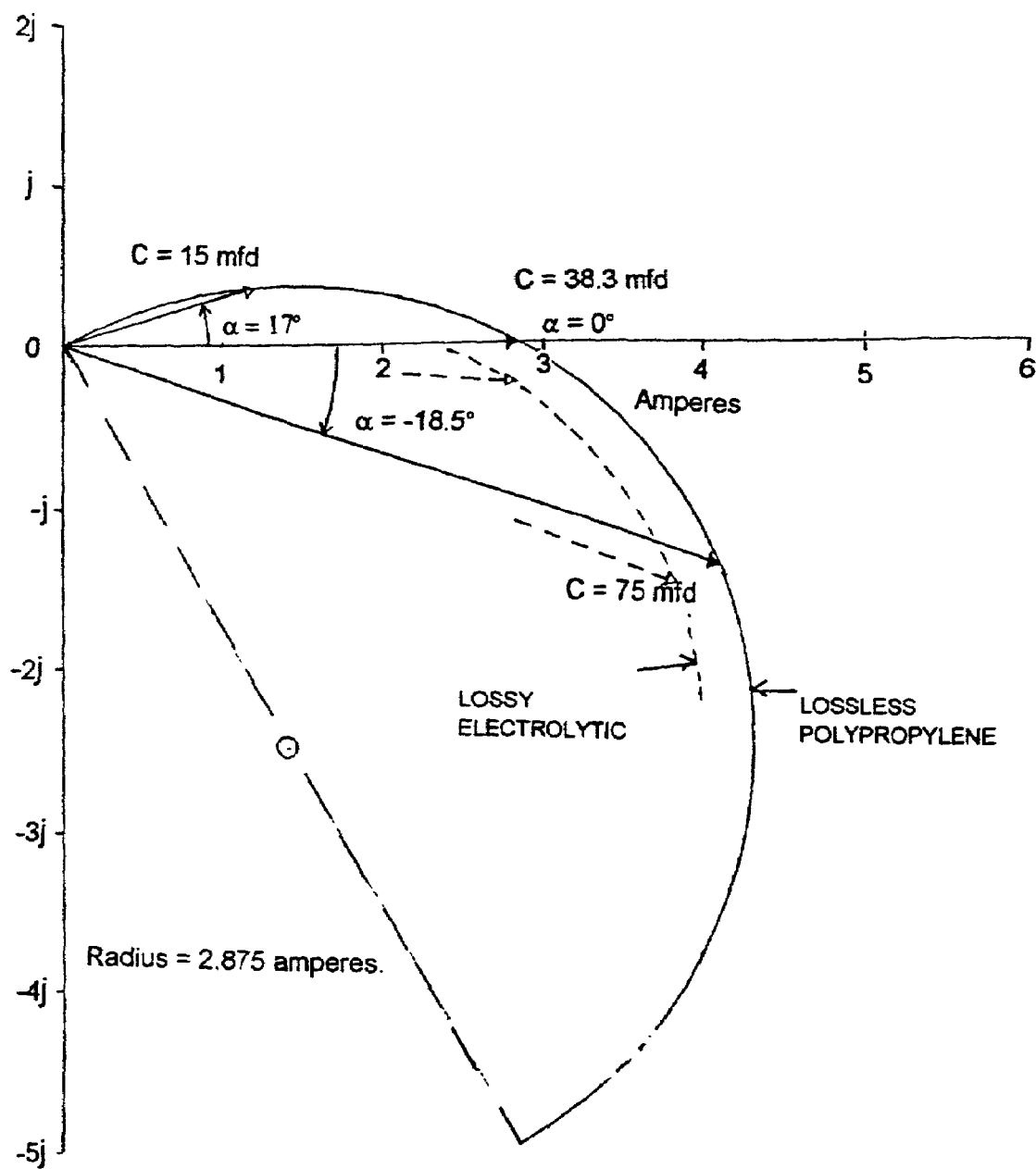
FIG. 8 is a diagram showing the locus of lossy currents of the lossy electrolytic capacitors shown in FIG. 7.

FIG. 8 is a phase diagram showing the current $I_a$ phasor locus for an R resistance of 40 ohms, and a CSA capacitance of from 15 microfarads up to 200 microfarads. This is for a power-supply voltage of 230 volts and a voltage across the "A series" circuit of 230 volts, 60 hertz. The calculations for this locus are given in TABLE II below. For 15 microfarads and 40 ohms, the current is 1.27 amperes leading by 17 degrees, which is lagging the D winding 222 voltage by 73 degrees. For 38 microfarads and 40 ohms, the current is 2.87 amperes at a phase of zero degrees, and this current is lagging the D winding voltage by 90 degrees. For 75 microfarads and 40 ohms, the current magnitude is 4.3 amperes and the phasor is lagging the reference by 18.5 degrees.

Applied to a 48,000 BTU/HOUR scroll compressor for an air conditioner, 10 mfd is insufficient to start the shaft turning. 15 mfd was sufficient for normal starting of the compressor motor. 75 mfd delivers much more torque, and starts the motor when the compressor had maximum back pressure.

The current locus in FIG. 8 for lossless capacitors is the solid-line circle with center at 2.875 amperes on the minus 60-degree line. The circle diameter is 5.75 amperes, and this is the maximum current which the circuit can deliver with infinite capacitance. This is 230 volts divided by 40 ohms.

In Table II, the effect of changing both the current magnitude and the phasor angle is reflected in the capacitive VARS delivered to the system. With 75 mfd, the capacitive vars was a maximum of 658 vars leading. These influence the air-gap flux, which contributes to the torque.

The projection of the current phasor onto the minus 40-degree line in FIG. 8 is approximately proportional to the torque contribution. The projection of the 75 mfd phasor onto the minus 40-degree line is approximately 4 amperes. Table II is the computation of the phasors for FIGS. 7 and 8. The columns therein can be identified as follows:

C Capacitance of 231=CS3=CSA in microfarads.

$X_c$ Capacitive reactance of CSA in ohms.

$V_c$ Voltage from 221 to 215 across 231=volts across CSA.

|Z| Impedance in ohms of circuit a from 213 to 215.

The phase angle of this impedance Z is negative and is Φ equals $\Phi = -a\tan(X_c/(RS))$.

RS Ohmic resistance at ambient temperature.

Φ Phase angle of impedance Z, often written/Φ).

$I_a = |I_a|/\underline{\alpha}$ = Current in circuit a from 213 to 215 of magnitude $|I_a|$ amperes and phase angle of/α degrees.

α=−α−Φ

α=90 −Θ

Θ=90−α=150+Φ

$I_d = |I_d|/\underline{90} - \Theta$ = Current component with respect to the winding voltage drop from 212 to 211 injected from circuit terminal 215 into winding terminal 212 of winding D of magnitude $|I_d|$ and lagging phase angle of Θ, always positive, lagging the voltage drop.

$|I_a| = |I_d|$

VARC Capacitive leading vars (volt-amperes) in 231=CSA of magnitude $(V_c)(|I_a|)$.

TABLE II

Lossless Capacitors 231 = CSA
R = ambient-temperature 40 ohms of resistor 156.
$V_a$ = 230 volts, /−60°
For Circuit "a" from 213 to 215.
with locus in FIG. 8

| C | −jX$_c$ | |Z| | /Φ | V$_c$ | |I$_a$| | /α | /Θ | VARC | Notes |
|---|---|---|---|---|---|---|---|---|---|
| 10 | 265 | 268 | −81.4 | 227.4 | 0.858 | +21 | 69 | 194 | #1 |
| 15 | 177 | 181 | −77.3 | 224.3 | 1.268 | 17 | 73 | 284 | #2 |
| 20 | 132 | 139 | −73.1 | 218.5 | 1.655 | 13 | 77 | 362 | |
| 25 | 106 | 113 | −69.3 | 215.2 | 2.03 | 9.3 | 81 | 437 | |
| 30 | 88.4 | 97.0 | −65.7 | 209.5 | 2.37 | 5.7 | 84.3 | 497 | |
| 35 | 75.8 | 85.7 | −62.2 | 203.1 | 2.68 | 2.2 | 87.8 | 544 | |
| 38.3 | 69.3 | 80.0 | −60.0 | 199.2 | 2.875 | 0.0 | 90.0 | 573 | #3 |
| 40 | 66.3 | 77.4 | −58.9 | 196.9 | 2.97 | −1.1 | 91.1 | 585 | |
| 50 | 53.1 | 66.4 | −53.0 | 183.7 | 3.46 | −7.0 | 97.0 | 636 | |
| 75 | 35.4 | 53.4 | −41.5 | 152.6 | 4.31 | −18.5 | 108.5 | 658 | #4 |
| 100 | 26.5 | 48.0 | −33.5 | 126.9 | 4.79 | −26.5 | 116.5 | 609 | |
| 125 | 21.2 | 45.3 | −27.9 | 107.8 | 5.08 | −32.1 | 122.1 | 548 | #5 |
| 200 | 13.3 | 42.1 | −18.4 | 72.6 | 5.46 | −41.6 | 131.6 | 395 | |

TABLE II-continued

Lossless Capacitors 231 = CSA
R = ambient-temperature 40 ohms of resistor 156.
$V_a$ = 230 volts, /−60°
For Circuit "a" from 213 to 215.
with locus in FIG. 8

| C | −jX$_c$ | \|Z\| | /Φ | V$_c$ | \|I$_a$\| | /α | /Θ | VARC | Notes |
|---|---|---|---|---|---|---|---|---|---|
| 1000 | 2.65 | 40.1 | −3.79 | 15.2 | 5.74 | −56.2 | 146.2 | 87.2 | |
| 5000 | 0.53 | 40.0 | −0.76 | 3.1 | 5.75 | −59.2 | 149.2 | 17.5 | |

Notes:
1 Scroll compressor is rated 48,000 BTU/HOUR. Compressor motor is 2 poles, 60 hertz, 230 volts, rated four kilowatts, 13.5 amperes per winding. Ten microfarads adds insufficient augmented torque to start the motor and compressor normally.
2 This is minimum acceptable augmented torque. 15 microfarads and 284 varc added sufficient augmented starting torque to start the motor and compressor normally.
3 38 microfarads and 570 varc is a basic design, with the injected current component in winding D from 212 to 211 lagging the winding voltage by Θ of ninety degrees, and contributing primarily magnetizing vars and magnetic flux, by making the winding current more lagging, without reducing the in-phase current component in that driven winding. On the phasor diagram in FIG. 8, the reference voltage 227–228 is the horizontal axis, and the windingreference voltage 212–211 is the vertical axis. The real part of the injected current I$_a$ into 212 primarily contributes magnetizing magnetomotive force to the flux in the air gap. The vertical coordinate (imaginary axis) of the injected current component I$_a$ into 212 primarily contributes current linking the air-gap flux and which is in-phase with the air-gap flux. Both of thesecomponents interact to produce the torque. The current I$_a$ should be lagging the winding voltage by at least 90 degrees to better match the locked-rotor current of the motor. For this #3 design, the torque is possibly triple the necessary minimum starting torque.
4 This is maximum economic torque. 75 microfarads and 658 varc contributed sufficient augmented starting torque, so that the compressor could start with full back pressure and run with full back pressure.
5 Additional capacitance at higher cost does not contribute cost-effective additional useful torque. The capacitive vars decreases at higher capacitances, and the useful current increases only one-third more than at 75 microfarads even with capacitances of thousands of microfarads.
SA The Normally-Open contacts on electromagnetic switch which momentarily close at the instant of starting before the shaft begins to turn, which are open when shaft speed approaches full-load speed, are closed for this analysis at locked-rotor.

A reasonable engineering design target is between 35 mfd and 75 mfd. Consider CSA of 40 microfarads and 232 R of 40 ohms. For a different compressor, requiring higher starting torque, two or three of the circuits from 216 to 215 can be used in parallel. Two circuits in parallel are equivalent to R of 20 ohms, and CSA of 80 microfarads for a design matching Note #3. Three circuits in parallel are equivalent to R of 13.3 ohms, and CSA of 120 microfarads. Four circuits in parallel are equivalent to R of 10 ohms, and CSA of 160 microfarads.

When lossless capacitors are used, this table above with all contacts closed for locked-rotor and cold initial state is applicable to FIGS. 6 and 7. The solid-line current locus from the above table is shown in FIG. 8 for lossless capacitors.

The PTC 225 in FIG. 6 performs two functions. When it is at ambient temperature, it is the ambient-temperature resistance 232 of R ohms in FIG. 7. When the PTC heats up in a fraction of a second, it opens the circuit, equivalent to opening the contacts 220 in FIGS. 1 and 2. This PTC eliminates the need for a time-delay contactor or a centrifugal switch to remove the starting capacitor circuit as the shaft approaches full-load speed.

The resistance R normally associated with the PTC, and which has been used in the above calculations, is the ambient-temperature resistance of the PTC. While the motor is running, a rated PTC voltage is across the PTC, and its temperature is high enough so that the resistance is in the kilo-ohm range. When the motor is turned off, by opening the switch 202–204 in FIGS. 6 & 7, no current flows through the PTC, and it cools off to the ambient temperature. It is then ready for the switch 202–204 to be reclosed and the motor started again. This sequence is quite satisfactory for furnace and heat-pump controls from a thermostat, because of the delay between the off-action and the on-action of the thermostat.

In the event that a special system has a short time delay after the off-action before the subsequent on-action, the temperature of the PTC may not have decreased all of the way back down to the ambient temperature. At this state, the PTC is "slightly warm" and its resistance is higher than that at the ambient-temperature resistance. For these kinds of systems, the resistance R value used in the designs of the above Tables I and II and in the Locus Diagrams included herein should be larger than the value listed in the catalog. The R value of 40 ohms in the above tables can refer to the "slightly warm" PTC resistance, and the component installed should have an ambient-temperature R of less than this amount, for example, 30 ohms, in order to have the desired starting torque at the least favorable "slightly warm" temperature or the least favorable duty cycle of the system.

The circuit in FIG. 7 with lossy electrolytic capacitors has the current values tabulated in TABLE III below. The losses in the capacitor are represented by an internal series resistance which is added to the ohmic resistance of the PTC during starting. The locus of these lossy currents is the dashed line in FIG. 8. This locus is not a circle, because the resistance varies with current. The diameter of the locus, however is still 5.75 amperes.

TABLE III

Lossy Electrolytic Starting Capacitors CSA, 231
Watts losses are 10% of the vars.
R = ambient-temperature 40 ohms for resistor 156.
$V_{213-215}$ = 230 volts, /−60°
CIRCUIT FIG. 7, LOCUS IN FIG. 8

| C | −jX$_c$ | |Z| | /Φ | V$_c$ | |I$_a$| | /α | /Θ | VARC | Notes |
|---|---|---|---|---|---|---|---|---|---|
| 10 | 265 | 273 | −75.9 | 223.1 | 0.842 | +15.9 | 74.1 | 187.9 | #6 |
| 15 | 177 | 186 | −71.9 | 218.7 | 1.235 | 11.9 | 78.1 | 270.2 | |
| 20 | 132 | 142.3 | −68.0 | 213.3 | 1.616 | 8.05 | 82.0 | 344.8 | #7 |
| 25 | 106 | 117.5 | −64.5 | 207.6 | 1.958 | 4.48 | 85.52 | 406.4 | |
| 30 | 88.4 | 101.0 | −61.1 | 201.3 | 2.277 | 1.08 | 88.92 | 458.4 | |
| 31.65 | 83.8 | 96.8 | −60.0 | 199.2 | 2.377 | 0.0 | 90.0 | 473.5 | #8 |
| 35 | 75.8 | 89.5 | −57.9 | 194.8 | 2.57 | −2.12 | 92.12 | 500.6 | |
| 40 | 66.3 | 81.1 | −54.9 | 188.1 | 2.84 | −5.12 | 95.12 | 533.8 | #9 |
| 50 | 53.1 | 69.8 | −49.5 | 175.0 | 3.29 | −10.47 | 110.5 | 576.5 | |
| 75 | 35.4 | 56.1 | −39.1 | 145.1 | 4.10 | −20.9 | 110.9 | 594.7 | #10 |
| 100 | 26.5 | 50.2 | −31.3 | 121.4 | 4.56 | −28.7 | 118.7 | 556.0 | |
| 125 | 21.2 | 47.16 | −26.7 | 103.4 | 4.88 | −33.3 | 123.3 | 504.2 | #11 |
| 200 | 13.3 | 43.4 | −17.8 | 70.5 | 5.30 | −42.2 | 132.2 | 373.2 | |
| 1000 | 2.65 | 40.4 | −3.76 | 15.1 | 5.70 | −56.2 | 146.2 | 86.1 | |
| 5000 | 0.53 | 40.1 | −0.76 | 3.0 | 5.74 | −59.2 | 149.2 | 17.5 | |

Notes
6 Scroll Compressor is rated 48,000 BTU/HOUR. Compressor motor is 2 poles, 60 hertz, 230 volts, rated four kilowatts, 13.5 amperes per winding. Ten microfarads adds insufficient augmented torque to start the motor and compressor normally.
7 This is minimum acceptable torque. 20 microfarads and 345 varc added sufficient augmented starting torque to start the motor and compressor normally.
8 32 microfarads and 474 varc is a basic design, with the injected current in winding 212–211 lagging the voltage by Θ of ninety degrees, and contributing primarily magnetizing vars and magnetic flux, by making the winding current more lagging, without reducing the in-phase current component in that driven winding. The torque for this design is possibly double the necessary minimum starting torque.
9 More than adequate starting torque.
10 This is maximum economic torque. 75 microfarads again delivers the maximum capacitive vars to the system. In this case it is 595 varcs. This is approximately ten percent less than in TABLE II.
11 Additional capacitance at higher cost does not contribute cost-effective additional useful torque. The useful current increases only 40 percent more than at 75 microfarads even with capacitances of thousands of microfarads.

A reasonable engineering design target for CSA is between 35 mfd and 75 mfd. Consider C of 40 microfarads and R of 40 ohms. For a different compressor, requiring higher starting torque, two or three of the circuits from 216 to 215 can be used in parallel. Two circuits in parallel are equivalent to R of 20 ohms, and CSA of 80 microfarads for a design matching Note #9. Three circuits in parallel are equivalent to R of 13.3 ohms, and CSA of 120 microfarads. Four circuits in parallel are equivalent to R of 10 ohms, and CSA of 160 microfarads.

In FIG. 6, there is a contactor 220 shown in series with the PTC 225. In a product to be manufactured, there would be no contactor. This contactor 220 is shown in the FIG. 6 to illustrate the action of the PTC, which when at ambient temperature has a reasonable ambient-temperature resistance like 40 ohms. The illustration is that the contactor 220 is closed when the PTC is at ambient temperature. When the PTC has warmed up due to current in the circuit, its resistance rises to a very high value, reducing the current to a very small amount. This is equivalent to having inside of the PTC a contactor like the contactor 220 which is then opened by the high temperature as far as the practical circuit performance is concerned. At rated voltage and high temperature, the PTC dissipates only a few watts. This is negligible compared to the motor power.

Figure 9:
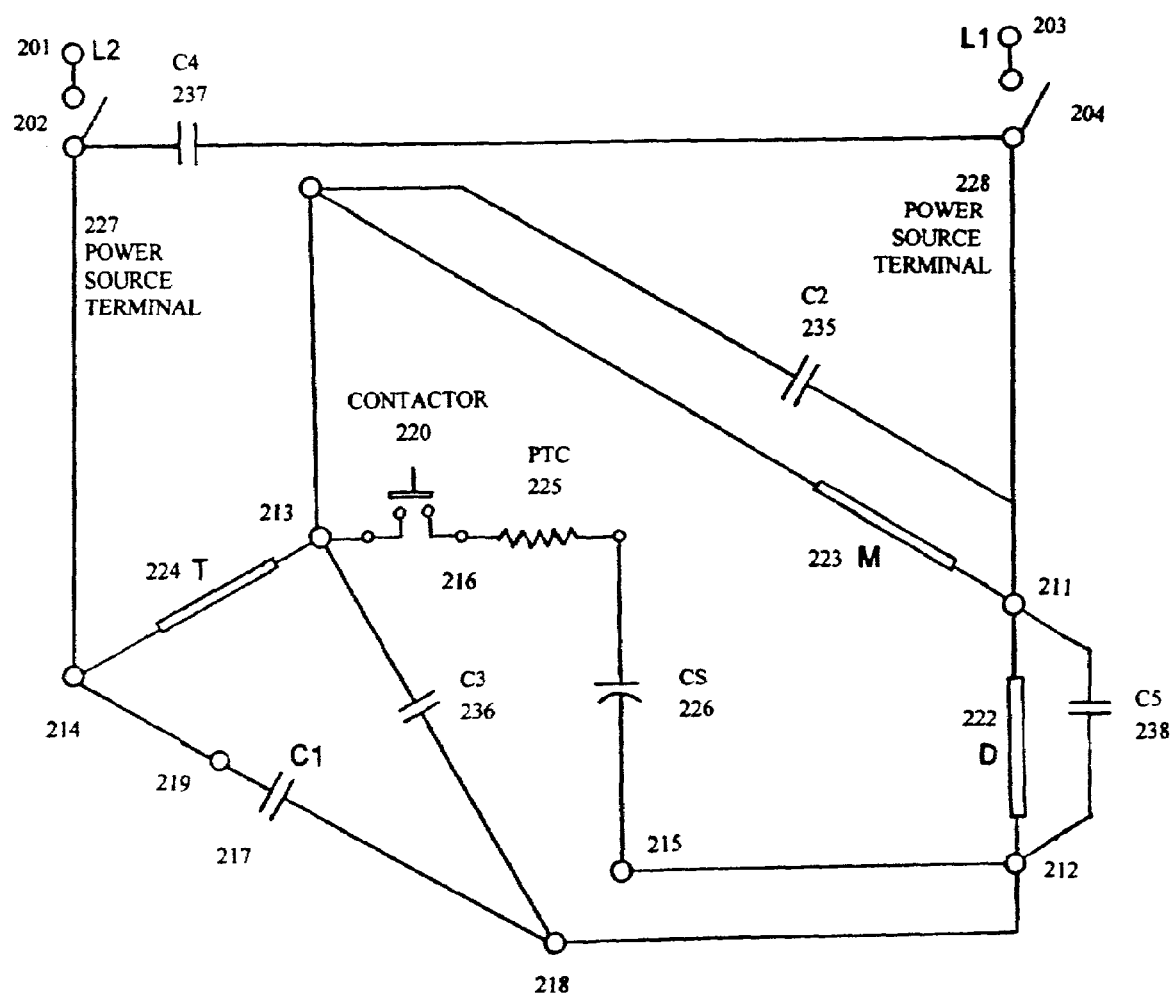
FIG. 9 is a circuit similar to that shown in FIG. 7 but augmented for use with a low power-factor motor.

FIG. 9 is a circuit diagram similar to that of FIG. 6, with the addition of run capacitors for use with a small low power-factor motor. The single-phase electrical power supply is between the two lines 201 and 203. Switch 202 energizes the first power source terminal 227. Switch 204 energizes the second power source terminal 228. The source terminal 227 energizes terminal 214. The source terminal 228 energizes terminal 211. A first motor winding T is connected between terminals 214 and 213. A second motor winding M is connected between terminals 213 and 211. A third motor winding D is connected between terminals 211 and 212. A first run capacitor 217 is connected between terminals 214 and 218. A second run capacitor 235 is connected between terminals 211 and 213. A third run capacitor 236 is connected between terminals 213 and 218. A fourth run capacitor 237 is connected between terminals 227 and 228. A fifth run capacitor 238 is connected between terminals 211 and 212.

Running normally, near full load, the capacitor 217 injects into terminal 218 and winding D a first current component which has an 87% power factor with respect to the winding voltage. The capacitor 235 injects into terminal 213 a second current component equal in magnitude to the said first current component with opposite phasor direction. Because the voltage across 235 is one-half of the voltage across 217, the microfarad value for 235 is twice the microfarad value for 217. These two capacitors, alone, are sufficient for a very large motor. For these large motors, the single-phase current in the lines 201 and 203 is leading by about 30 degrees, with a leading power-factor of 86% or larger.

Small motors, however, have a much lower power-factor, and they need winding currents with phasors that are more lagging. Capacitor 236 injects into terminal 218 for injection into 212 and winding D a current leading the supply phase by 30 degrees, and lagging the winding D voltage phase by 60 degrees. This is the 50% power-factor component. An identical magnitude and negative angle current is injected by capacitor 236 into terminal 213. These three capacitors are satisfactory for motors of one horsepower and larger.

Most of these motors will have a resultant single-phase line current which is leading power-factor.

A three-phase motor with a three-phase loaded power factor of 65.6% lagging has winding currents which lag each winding voltage by 49 degrees. When this motor is used in FIG. 9, and the three capacitors are chosen for balanced winding currents and balanced winding voltages, then at this load state, the single-phase line current in 201 and 203 is unity power factor.

For motor rated power factors between 65.5% and 50%, and a balanced design of the capacitors is used for the rated power-factor, the power line current power-factor will be lagging. For these motors a fourth run capacitor 237 connected between 227 and 228 is provided to correct the line power-factor to unity power-factor when this is desired.

When the small motor full-load power-factor is 50%, and the winding currents lag the winding voltages by 60 degrees, only the third capacitor 236 is necessary, and capacitors 217 and 235 may be omitted. In this case, the single-phase line current has a power-factor near 87% lagging. To bring the line power-factor up to unity, a fourth run capacitor 237 connected between 227 and 228 is provided which is essentially across the power supply.

For small motors with full-load three-phase line power-factors of less than 50%, run capacitor 236 can be augmented by a fifth run capacitor 238, connected between terminals 212 and 211. This fifth capacitor 238 contributes a current of zero % power-factor, which combined with the current component of 50% power-factor contributed by the third run capacitor 236, can produce any resultant injected current power-factor desired between 50% and 0%.

Figure 10:
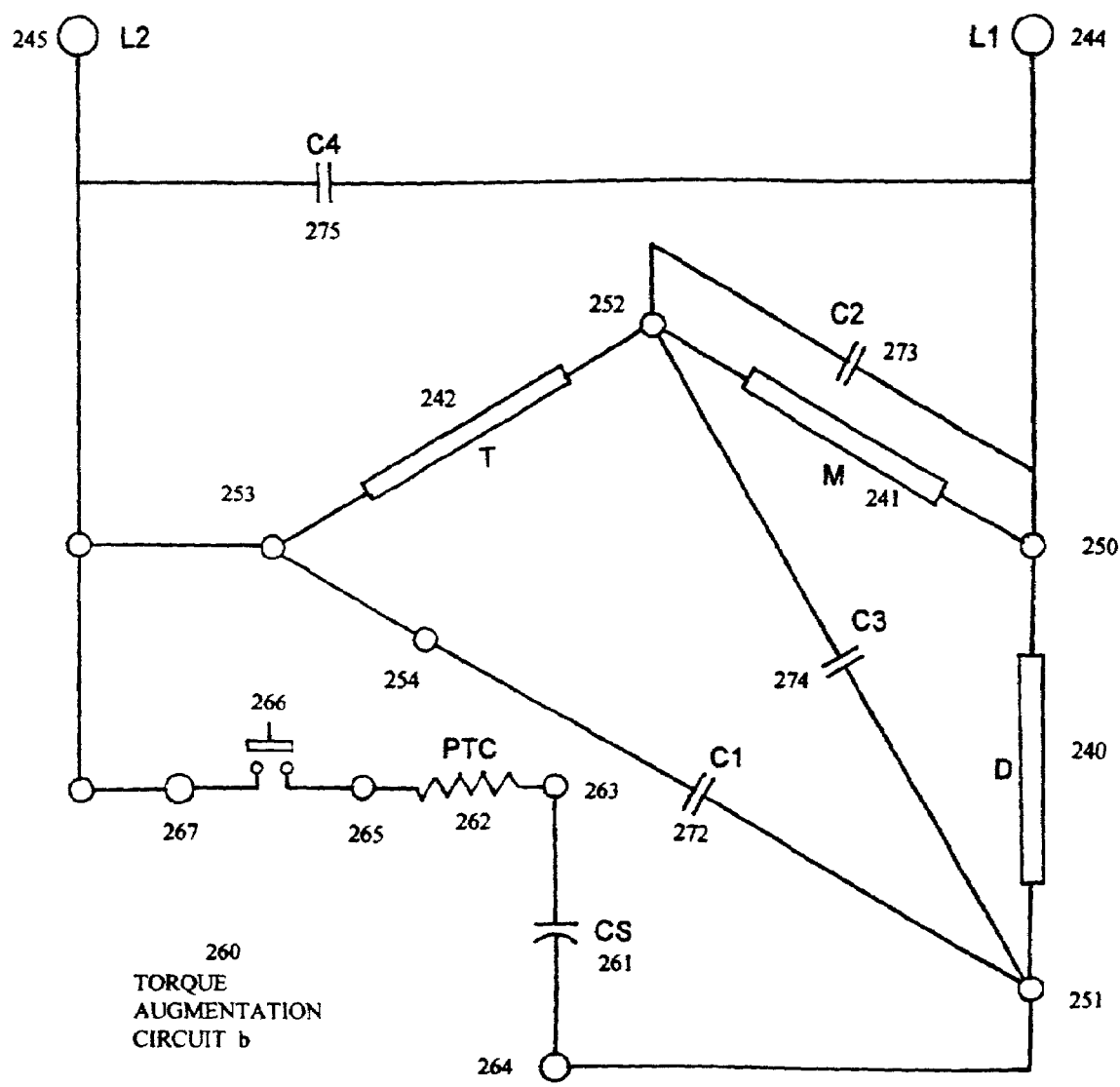
FIG. 10 is a circuit diagram for an alternate torque augmentation circuit for use with larger motors.

FIG. 10 shows an alternate torque augmentation circuit of the present invention for use with larger motors. FIG. 10 shows a rotary induction motor with three windings 240, 241, and 242, four motor winding terminals 250, 251, 252, and 253, a two-line single-phase power supply with lines 244 and 245, and a torque augmentation circuit 260 with a starting capacitor 261 and a PTC thermistor 262. The first motor winding 240 is connected between a first winding terminal 250 and a second winding terminal 251. The second motor winding 241 is connected between the first winding terminal 250 and a third winding terminal 252. The third motor winding 242 is connected between the third winding terminal 252 and the fourth winding terminal 253. The power supply first line 244 is connected to the first winding terminal 250. The power supply second line 245 is connected to the fourth winding terminal 253. The positive-temperature-coefficient PTC thermistor 262 is connected between a first end terminal 265 and an intermediate terminal 263. The starting capacitor 261 is connected between the intermediate terminal 263 and a second end terminal 264. This second end terminal is connected to the second winding terminal 251. A contactor 266 is connected between the first end terminal 265 and a switch pole 267. The switch pole 267 is connected to the fourth winding terminal 253 and also to the power supply second line 245. Contactor 266 is optional, and will be considered always closed for this discussion.

With these connections, when the ac voltage appears across the power supply terminals, a voltage appears between the first end terminal 265 and the second end terminal 264. This voltage is across the series connection of the PTC resistance 262 and the capacitive reactance of the capacitor 261, and an initial starting current flows in this series circuit. The voltage reference for phasors is the line voltage between terminals 245 and 244, which is assigned a zero phasor angle. With respect to this reference voltage phase, the voltage across the series circuit from terminals 265 to 264 is lagging by approximately 30 degrees. The current in this circuit can have a phase angle between plus 60 degrees and minus 30 degrees, depending upon the magnitudes of the resistance and reactance. This current, combined with the current through the windings 242 and 241, can start the motor and accelerate it to near full speed.

During the acceleration interval, the current in PTC 262 heats up the thermistor, causing its resistance to increase enormously, so that the said series current is essentially negligible when the motor is running at full speed. With this mode, the two windings 242 and 241 are the only windings carrying this single-phase current, and the motor is running as a single-phase motor. Its permissible shaft torque load is only half of the nameplate, because the motor was not designed for this mode of operation.

The motor permissible power on single-phase can be increased to the full nameplate three-phase power rating by the proper use of run capacitors. The first motor-run capacitor 272 is connected between the second power-supply terminal 245 and the second winding terminal 251. The second motor-run capacitor 273 is connected between the first power-supply terminal 244 and the third winding terminal 252. The third motor-run capacitor 274 is connected between the third winding terminal 252 and the second winding terminal 251. With these three capacitors, the run current injected into winding 240 at terminal 251 can equal the name-plate rated line current at the nameplate rated three-phase power-factor. Design equations for the values of these capacitors is described in U.S. Pat. No. 6,025,693. Column 14 in U.S. Pat. No. 6,025,693 with respect to FIG. 6 has in lines 1 through 26 the calculations of the values of the three run capacitors from the known full-load current and full-load power-factor. These equations are applicable to FIG. 10 herein. With these equations, the resulting capacitances of 272, 273, and 274 will produce balanced winding currents and balanced winding voltages at full load. For a small motor, capacitor 275 connected between power supply first line 244 and power supply second line 245 can bring the single-phase line current to unity power-factor.

Figure 11:
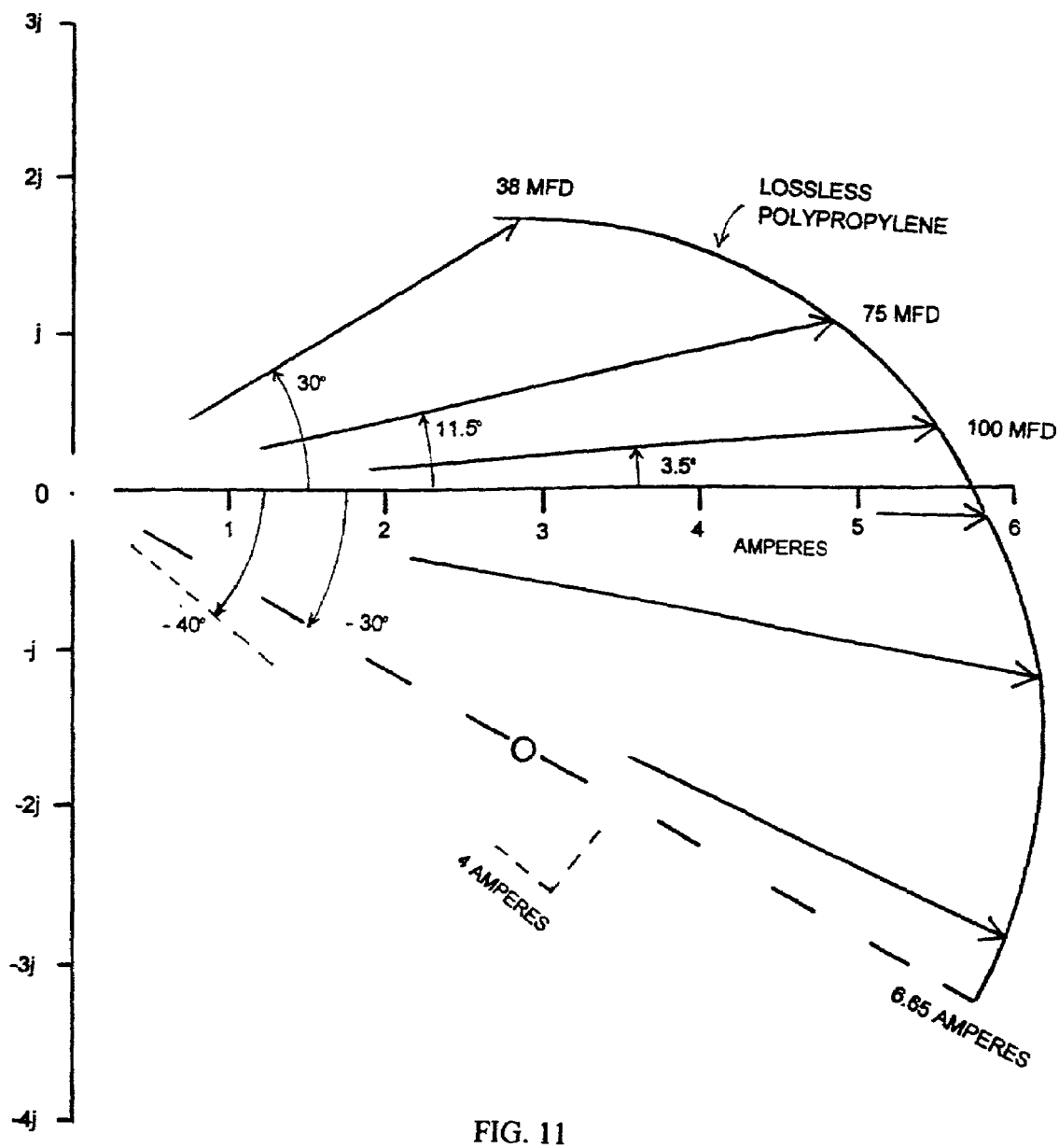
FIG. 11 is a circuit diagram showing the locus of the injected phasor current locus for the circuitry shown in FIG. 10.

FIG. 11 is a diagram showing the locus of the injected current from the PTC and CS starting capacitor into the driven winding D of the motor in FIG. 10. The phase of this current can be adjusted between leading 30 degrees (lagging the motor D winding voltage by 60 degrees) and a lagging phase of minus 30 degrees (lagging the motor D winding by 120 degrees).

Table IV is the computation of the phasors for FIGS. 10 and 11. The columns are identified as follows:

C Capacitance of CS=CSB 261 in microfarads.
Xc Capacitive reactance of CSB in ohms.
Vc Voltage from 263 to 264 across CSA 261 of 177 in volts.
|Z| Impedance in ohms of circuit b from 265 to 264.
Φ Phase angle of impedance Z, often written/Φ.
Ib=|Ib|/=β=Current in circuit b from 153 to 183 to 172 of magnitude
|b| amperes and phase angle of/β degrees.
Id=|Id|/90−Θ=Current component injected into circuit terminal 172 at winding terminal 172 into winding D from 172 to 171 of magnitude |Id| and phase angle of Θ, always positive, lagging the voltage drop from 172 to 171.
β=−30−Φ
Θ=90−β=120+Φ
|Ib|=|Id|
VARC Capacitive leading vars (volt-amperes) in 177=CSB of magnitude (Vc)(|Ib|).
SB Normally-Open contacts on electromagnetic switch which momentarily close at the instant of starting before the shaft begins to turn, and which are open when shaft speed approaches full-load speed.

A reasonable engineering design target for CSB is between 40 mfd and 100 mfd. Consider CSB of 40 microfarads and R of 40 ohms. For a different compressor, requiring higher starting torque, two or three of the circuits from 173 to 172 can be used in parallel. Two circuits in parallel are equivalent to R of 20 ohms, and CSB of 80 microfarads for a design matching Note #12. Three circuits in parallel are equivalent to R of 13.3 ohms, and CSB of 120 microfarads. Four circuits in parallel are equivalent to R of 10 ohms, and CSB of 160 microfarads.

When lossless capacitors are used, this TABLE IV is applicable to FIG. 10 with the 266 contacts closed. The phasor currents from this table are plotted in FIG. 11. The locus is a circle with the center at 3.33 amperes at −30 degrees. The radius is 3.33 amperes and the diameter is 6.65 amperes. The 100 mfd phasor is 5.54 amperes leading 3.5 degrees. The projection of this phasor on the minus 40-degree line is approximately four amperes in FIG. 11.

The projection of the current phasor onto the minus 40-degree line in FIG. 11 is approximately proportional to the torque contribution. The projection of the 75 mfd phasor onto the minus 40-degree line in FIG. 11 is approximately four amperes.

The phase angles used in the above table and in the FIG. 11 are

Phi=Φ Theta=Θ Beta=β Delta=δ

TABLE IV

Lossless Capacitors CSB
176 ambient-temperature R = 40 ohms.
V$_{173-172}$ = 266 volts, /−30°
For circuit b across 173 and 172.
CIRCUIT OF FIG. 10; LOCUS IN FIG. 11.

| C | −jX$_c$ | |Z| | /Φ | Vc | |Ib| | /β | /Θ | VARC | Notes |
|---|---|---|---|---|---|---|---|---|---|
| 10 | 265 | 268 | −81.4 | 263.0 | 0.993 | +51 | 39 | 261.1 | |
| 15 | 177 | 181 | −77.2 | 260.1 | 1.470 | 47 | 43 | 382.3 | |
| 20 | 132 | 139 | −73.1 | 252.7 | 1.914 | 43 | 47 | 483.6 | #11 |
| 25 | 106 | 113 | −69.3 | 248.9 | 2.35 | 39.3 | 51 | 584.2 | |
| 30 | 88.4 | 97.0 | −65.7 | 242.3 | 2.74 | 35.7 | 54.3 | 664.1 | |
| 35 | 75.8 | 85.7 | −62.2 | 234.9 | 3.10 | 32.2 | 57.8 | 728.2 | |
| 38.3 | 69.3 | 80.0 | −60.0 | 230.4 | 3.33 | 30.0 | 60.0 | 766.1 | |
| 40 | 66.3 | 77.4 | −58.9 | 227.7 | 3.43 | 28.9 | 61.1 | 782.2 | #12 |
| 50 | 53.1 | 66.4 | −53.0 | 212.5 | 4.00 | 23.0 | 67.0 | 850.3 | |
| 75 | 35.4 | 53.4 | −41.5 | 176.8 | 4.99 | 11.5 | 78.5 | 883.1 | |
| 100 | 26.5 | 48.0 | −33.5 | 146.8 | 5.54 | 3.5 | 86.5 | 813.2 | #13 |
| 114.9 | 23.1 | 46.2 | −30.0 | 133.0 | 5.76 | 0.0 | 90.0 | 765.8 | #14 |
| 125 | 21.2 | 45.3 | −27.9 | 107.8 | 5.88 | −2.1 | 92.1 | 731.7 | #15 |
| 200 | 13.3 | 42.1 | −18.4 | 84.0 | 6.31 | −11.6 | 101.6 | 530.3 | |
| 1000 | 2.65 | 40.1 | −3.79 | 17.6 | 6.64 | −26.2 | 116.2 | 116.7 | |
| 5000 | 0.53 | 40.0 | −0.76 | 3.52 | 6.65 | −29.2 | 119.2 | 23.4 | |

Notes:
11 Scroll compressor is rated 48,000 BTU/HOUR. Compressor motor is 2 poles, 60 hertz, 230 volts, rated four kilowatts, 13.5 amperes per winding. Twenty microfarads adds insufficient augmented torque to start the motor and compressor normally.
12 This is minimum acceptable torque. 40 microfarads and 780 varc added sufficient augmented starting torque to start the motor and compressor normally.
13 This is maximum economic torque. 100 microfarads and 813 varc contributed sufficient augmented starting torque, so that the compressor could start with full back pressure and run with full back pressure.
14 115 microfarads and 766 varc is a basic design, with the injected current in winding D of 172–171 lagging the voltage by ninety degrees, and contributing primarily magnetizing vars and magnetic flux, by making the winding current more lagging, without reducing the in-phase current component in that driven winding.
15 Additional capacitance at higher cost does not contribute cost effective additional useful torque. The useful varc is decreased at higher capacitances.

TABLE V

Lossy Electrolytic Capacitors CSB
RB = The ambient-temperature resistance of the PTC Thermistor 262 = 40 ohms
Watts losses are 10% of the vars.
$V_{265-264}$ = 266 volts, /−30°
For circuit b from 265 to 264 to 251 in FIG. 10.
β = (−Θ) − 30.

| C | −jX$_c$ | \|Z\| | /Φ | Vc | \|Ib\| | /β | /Θ | VARC | Notes |
|---|---|---|---|---|---|---|---|---|---|
| 10 | 265 | 273 | −75.9 | 258.2 | 0.9744 | +45.9 | 44.1 | 251.6 | |
| 15 | 177 | 186 | −71.9 | 253.1 | 1.430 | 41.9 | 48.1 | 362.0 | |
| 20 | 132 | 142.3 | −68.0 | 246.7 | 1.869 | 38.1 | 51.9 | 461.2 | #16 |
| 25 | 106 | 117.5 | −64.4 | 240.0 | 2.264 | 34.4 | 55.6 | 543.2 | |
| 30 | 88.4 | 101.0 | −61.1 | 232.8 | 2.634 | 31.1 | 58.9 | 613.2 | |
| 31.6 | 83.8 | 96.8 | −60.0 | 230.4 | 2.748 | 30.0 | 60.0 | 633.1 | |
| 35 | 75.8 | 89.5 | −57.9 | 225.3 | 2.972 | 27.9 | 62.1 | 669.6 | |
| 38.3 | 69.3 | 83.7 | −55.9 | 220.2 | 3.178 | 25.9 | 64.1 | 700.0 | |
| 40 | 66.3 | 81.1 | −54.9 | 217.5 | 3.28 | 24.9 | 65.1 | 713.2 | #17 |
| 50 | 53.1 | 69.8 | −49.5 | 202.4 | 3.81 | 19.5 | 70.5 | 771.2 | |
| 75 | 35.4 | 56.1 | −39.1 | 167.9 | 4.74 | 9.12 | 80.9 | 796.0 | |
| 100 | 26.5 | 50.2 | −31.9 | 146.8 | 5.54 | 1.88 | 88.1 | 795.9 | #18 |
| 108.25 | 24.5 | 49.0 | −30.0 | 132.95 | 5.426 | 0.00 | 90.0 | 721.4 | #19 |
| 115 | 23.1 | 48.2 | −28.6 | 127.5 | 5.52 | −1.37 | 91.4 | 703.4 | |
| 125 | 21.2 | 47.2 | −26.7 | 119.6 | 5.64 | −3.26 | 93.3 | 674.4 | #20 |
| 200 | 13.3 | 43.4 | −17.8 | 81.52 | 6.13 | −12.16 | 102.2 | 499.6 | |
| 1000 | 2.65 | 40.4 | −3.76 | 17.45 | 6.58 | −26.23 | 116.2 | 114.9 | |
| 5000 | 0.53 | 40.1 | −0.76 | 3.52 | 6.63 | −29.24 | 119.2 | 23.3 | |

Notes:
16 Scroll compressor is rated 48,000 BTU/HOUR. Compressor motor is 2 poles, 60 hertz, 230 volts, rated four kilowatts, 13.5 amperes per winding. Twenty microfarads adds insufficient augmented torque to start the motor and compressor normally.
17 This is minimum acceptable torque. 40 microfarads and 713 varc adds sufficient augmented starting torque to start the motor and compressor normally.
18 This is maximum economic torque. 100 microfarads and 796 varc contribute sufficient augmented starting torque, so that the compressor can start with full back pressure and run with full back pressure.
19 108 microfarads and 721 varc is a basic design, with the injected current in winding D of 251–250 lagging the voltage by ninety degrees, and contributing primarily magnetizing vars and magnetic flux, by making the winding current more lagging, without reducing the in-phase current component in that driven winding.
20 Additional capacitance at higher cost does not contribute cost-effective additional useful torque. The varc is decreased at higher capacitances.

A reasonable engineering design target for CSB is between 50 mfd 100 mfd. Consider C of 50 microfarads and R of 40 ohms. For a different compressor, requiring higher starting torque, two or three of the circuits from 265 through 264 to 251 can be used in parallel. Two circuits in parallel are equivalent to R of 20 ohms, and CSB of 100 microfarads for a design better than Note #17. Three circuits in parallel are equivalent to R of 13.3 ohms, and CSB of 150 microfarads. Four circuits in parallel are equivalent to R of 10 ohms, and CSB of 200 microfarads.

When lossy electrolytic starting capacitors are used, this TABLE V is applicable to FIG. 10 with contacts 266 closed.

Figure 12:
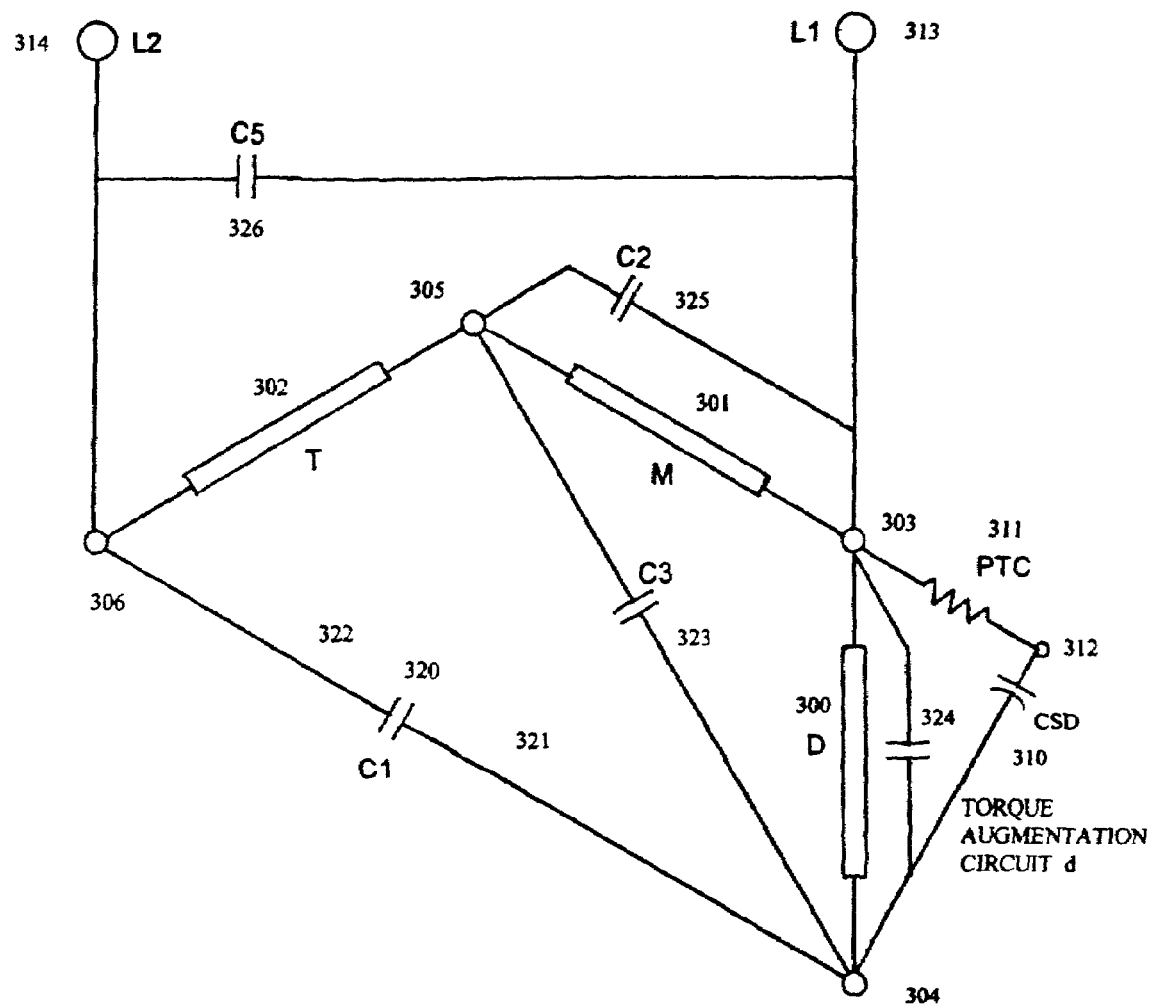
FIG. 12 is a circuit diagram showing alternate connections for use of a torque augmentation circuit for use with a compressor assembly of the present invention.

FIG. 12 is a circuit diagram also incorporating the present invention and shows a rotatable electrical induction apparatus with three stator windings with three different phases 300, 301 and 302, with four winding terminals 303, 304, 305 and 306, a motor-starting capacitor 310, a positive-temperature-coefficient PTC thermistor 311, and an alternating current single-phase power supply with lines 313 and 316. The motor winding 300 is connected between winding terminals 303 and 304. The motor winding 301 is connected between winding terminals 303 and 305. The motor winding 302 is connected between winding terminals 305 and 306. The PTC thermistor 311 is connected between winding terminal 303 and an intermediate terminal 312. The starting capacitor 310 is connected between the said intermediate terminal 312 and the winding terminal 304. The first supply line 313 is connected to the first winding terminal 303. The second supply line 314 is connected to the fourth winding terminal 306. The rotatable machine has a rotor which can be either a cage rotor or a wound rotor. The rotor windings are magnetically coupled across the air-gap to all three of the stator windings.

The performance of this apparatus is as follows. When the power lines apply a line voltage from 314 to 313, this reference voltage is impressed across terminals 306 to 303, and a current lagging this reference voltage flows through winding 302 and through winding 301. This locked-rotor current induces a rotating current and rotating voltage in the machine rotor windings, which are standing still at the locked-rotor initial state, and this rotating flux in the machine air-gap induces voltages in the stator windings. The induced voltage in winding 300 from 304 to 303 leads in phase with respect to the reference voltage. Stated differently, this induced voltage in winding 300 from 303 to 304 lags in phase with respect to the reference voltage.

The series connection of the PTC 311 and the starting capacitor 310 has an impedance with a negative phase angle due to the capacitance. The current flowing from 303 through 311 to 312 and through 310 to 304 has a negative phase angle with respect to the reference voltage. This phase angle can be between minus 5 degrees and minus 90 degrees. This current is injected into the terminal 304 of winding 300, and flows up through winding 300 from 304 to 303. This current in the winding 300 is lagging the voltage from 304 to 303 in winding 300 by an angle between 95 degrees and 180 degrees. This is called the locked-rotor injected starting current.

At the instant of restart or energization of the machine, when the rotor is stationary, the currents are called (locked-rotor) starting currents. This (locked-rotor) starting current in winding 300 in conjunction with the (locked-rotor) starting currents in windings 302 and 301, produce a desirable (locked-rotor) starting torque, which can accelerate the rotor shaft up to normal running speed.

During acceleration, the current through the PTC thermistor 311 produces resistive thermal losses, and these heat up the thermistor. The characteristic of this thermistor is that the heat increases the temperature of the thermistor, which in turn increases the resistance, and the thermistor resistance goes to a very high value in a fraction of a second. The steady-state running condition of the thermistor is a resistance in the kilo-ohm range, a current less than one ampere, and a few watts loss. At full speed, this increase in PTC 311 resistance is equivalent to opening a switch inside of the PTC to diminish the current in the starting capacitor 310, so that the voltage across the PTC thermistor terminals is essentially equal to the voltage across the winding 300, and the voltage across the starting capacitor 310 is almost zero.

In the state described above, at full speed, there is negligible current from 310 in winding 300. The complete motor in FIG. 12 has run capacitors 320, 323, 324, and 325. When the machine is running as a single-phase motor with all of these capacitors, there can be nearly balanced currents in the windings 300, 301, and 302.

Figure 13:
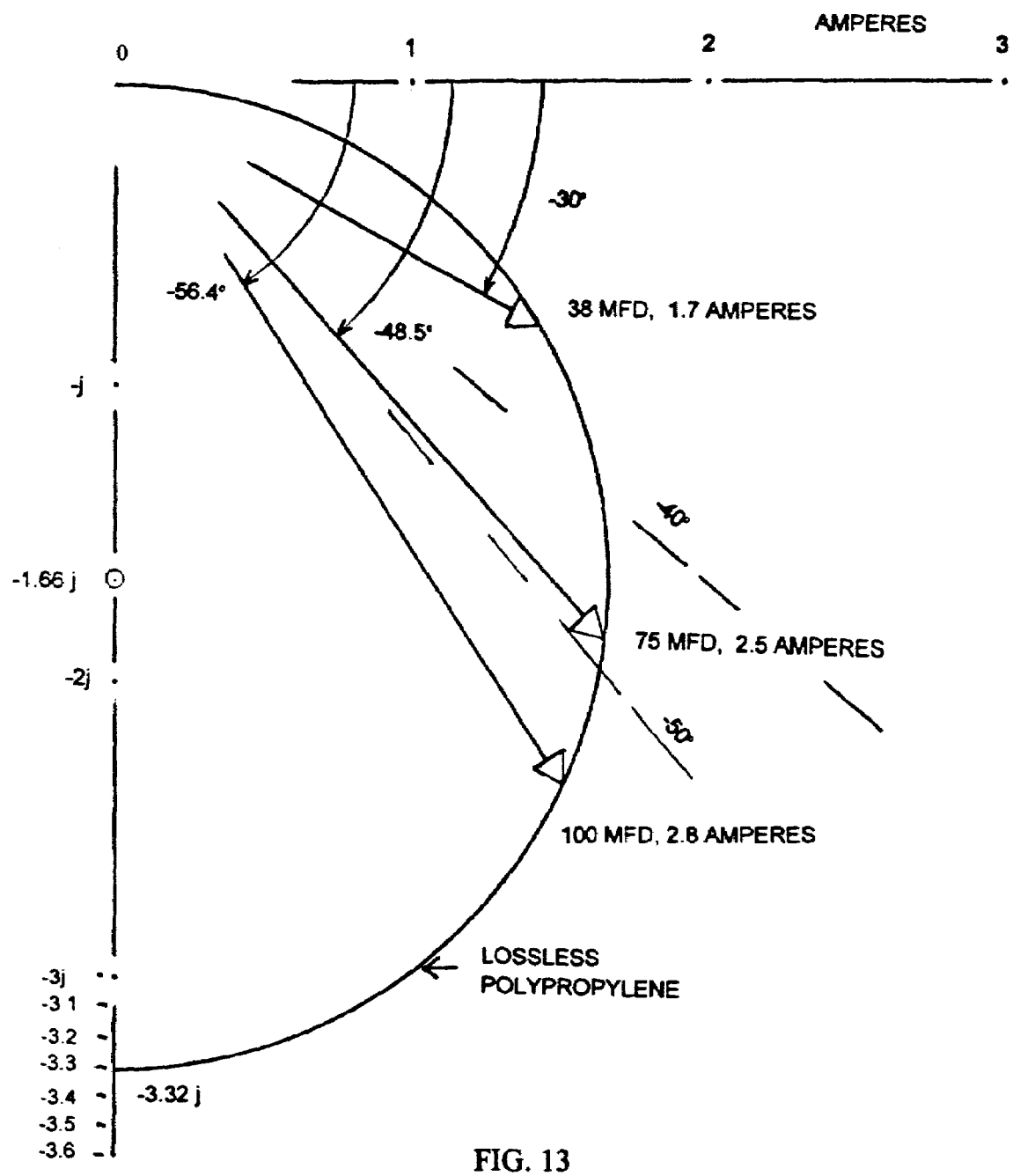
FIG. 13 is a diagram showing the locus of the injected phasor current for the circuit shown in FIG. 12.

FIG. 13 is a locus diagram that shows the current $I_d$ locus for an applied voltage of 230 volts, for a fixed thermistor 311 which has an ambient-temperature resistance RD of 40 ohms. With CSD 310 of 38 microfarads, the augmented starting current $I_d$ is 1.7 amperes lagging the reference voltage by 30 degrees, and lagging the D winding 300 voltage by 120 degrees. This is suitable for a one-ton compressor for an air conditioner or a refrigerator. With CSD 310 of 75 microfarads, the augmented starting current $I_d$ is 2.5 amperes lagging the reference voltage by 48.5 degrees, and lagging the D winding 300 voltage by 138.5 degrees. This is suitable for a two-ton compressor for an air conditioner or a refrigerator. A CSD 310 of 100 microfarads would carry a starting current $I_d$ of 2.8 amperes.

The circle locus in FIG. 13 has a diameter of 3.32 amperes and the center of the circle is at 1.66 amperes at minus 90 degrees.

To obtain larger augmented starting torques with this circuit, lower values of PTC ambient-temperature resistance can be used. Table VI has the designs for a constant injected power-factor and constant injected current lag angle. This table is for an injected power-factor of minus 37.6% for a current lagging the winding voltage by 112 degrees.

Table VI is the computation of the phasors for FIG. 12. The columns are identified as follows:

C Capacitance of CSD 310 in microfarads.
Xc Capacitive reactance of CSD 310 in ohms.
Vc Voltage from 304 to 312 across CSD 310 in volts.
RD Ohmic value of ambient-temperature PTC 311.
|Z| Impedance in ohms of circuit d from 303 to 312 to 304 through the ambient-temperature PTC 311 and CSD 310.
Φ Phase angle of impedance Z, often written/$\underline{\Phi}$.
Id=|Id|/$\underline{\delta}$=Current in circuit d from 303 to 312 to 304 of magnitude |Id| amperes and phase angle of/$\underline{\delta}$ degrees.
δ=−90−Φ
$I_D$=|$I_D$|/90−Φ=Current component injected into circuit terminal 304 of the D winding 300, of magnitude |$I_D$| and phase-difference difference angle Θ, always positive, lagging the voltage drop from 304 to 303.
Θ=90−δ=180+Φ
|Id|=|$I_D$|
VRD=voltage across the ambient-temperature resistance RD of thermistor PTC 311.
VRD=$V_{303-312}$=50.0 volts.
VARC Capacitive leading vars (volt-amperes) in CSD 310 of magnitude (Vc)(|Id|).
SD Normally-Open contacts on electromagnetic switch which momentarily close at the instant of starting before the shaft begins to turn, and which are open when shaft speed approaches full-load speed.

TABLE VI

Lossless Starting Capacitors CSD 310

$V_{303-304}$ = 133 volts, /−90°

For Circuit d across 303 to 304.

|Id| = |$I_D$|

RD = ambient-temperature resistance of PTC THERMISTOR 311.

$V_{RD}$ = $V_{303-311}$ = 50.0 volts.

The voltage across the PTC resistance RD at ambient temperature is a constant 50 volts for all of the entries in TABLE VI.

| RD | C | −jXc | |Z| | /Φ | Vc | |Id| | /δ | /Θ | VARC | Notes |
|---|---|---|---|---|---|---|---|---|---|---|
| 107.8 | 10.0 | 265.2 | 286.27 | −67.9 | 123.0 | 0.464 | −22.12 | 112.1 | 57.1 | |
| 53.9 | 20.0 | 132.6 | 143.14 | −67.9 | 123.0 | 0.928 | −22.12 | 112.1 | 114.1 | |
| 26.9 | 40.0 | 66.3 | 71.568 | −67.9 | 123.0 | 1.856 | −22.12 | 112.1 | 228.2 | |
| 18.0 | 60.0 | 44.2 | 47.712 | −67.9 | 123.0 | 2.783 | −22.12 | 112.1 | 342.4 | |
| 13.5 | 80.0 | 33.2 | 35.784 | −67.9 | 123.0 | 3.711 | −22.12 | 112.1 | 456.5 | |
| 12.0 | 90.0 | 29.5 | 31.808 | −67.9 | 123.0 | 4.175 | −22.12 | 112.1 | 513.5 | *41 |
| 10.8 | 100.0 | 26.5 | 28.628 | −67.9 | 123.0 | 4.639 | −22.12 | 112.1 | 570.6 | |
| 8.98 | 120.0 | 22.1 | 23.856 | −67.9 | 123.0 | 5.567 | −22.12 | 112.1 | 684.7 | |
| 7.70 | 140.0 | 18.95 | 20.451 | −67.9 | 123.0 | 6.493 | −22.12 | 112.1 | 798.7 | |

TABLE VI-continued

Lossless Starting Capacitors CSD 310
$V_{303-304}$ = 133 volts, /−90°
For Circuit d across 303 to 304.
|Id| = |$I_D$|
RD = ambient-temperature resistance of PTC THERMISTOR 311.
$V_{RD}$ = $V_{303-311}$ = 50.0 volts.
The voltage across the PTC resistance RD at ambient temperature is a
constant 50 volts for all of the entries in TABLE VI.

| RD | C | −jXc | |Z| | /Φ | Vc | |Id| | /δ | /Θ | VARC | Notes |
|---|---|---|---|---|---|---|---|---|---|---|
| 6.74 | 160.0 | 16.6 | 17.892 | −67.9 | 123.0 | 7.422 | −22.12 | 112.1 | 912.9 | |
| 5.41 | 200.0 | 13.3 | 14.314 | −67.9 | 123.0 | 9.278 | −22.12 | 112.1 | 1,141.1 | |

Notes:
*41 This injected current Id of 4.175 amperes at Θ of 112.1 degrees from 90 microfarads is similar to the injected current Ia in Table I for FIG. 3 of 4.31 amperes at Θ of 108.5 degrees from 75 microfarads. These produce approximately the same starting torque.

TABLE VII has a lower capacitance for a given resistance and a lower resistance for a given capacitance, compared to TABLE VI. The lag angle in Table VII of 107 degrees is less than the lag angle in Table VI of 112 degrees.

TABLE VII

Lossless Starting Capacitors CSD 310
$V_{303-304}$ = 133 volts, /−90°
For Circuit d across 303 to 304.
|Id| = |$I_D$|
RD = ambient-temperature ohmic value of PTC 311 in the D circuit.
$V_{RD}$ = $V_{303-311}$ = 38.5 volts.

| RD | C | −jXc | |Z| | /Φ | Vc | |Id| | /δ | /Θ | VARC | Notes |
|---|---|---|---|---|---|---|---|---|---|---|
| 80.0 | 10.0 | 265.2 | 277.0 | −73.2 | 127.1 | 0.479 | −16.8 | 106.8 | 60.9 | |
| 40.0 | 20.0 | 132.6 | 138.5 | −73.2 | 127.1 | 0.959 | −16.8 | 106.8 | 121.9 | |
| 20.0 | 40.0 | 66.3 | 69.3 | −73.2 | 127.1 | 1.917 | −16.8 | 106.8 | 243.8 | |
| 13.3 | 60.0 | 44.2 | 46.2 | −73.2 | 127.1 | 2.876 | −16.8 | 106.8 | 365.7 | |
| 10.0 | 80.0 | 33.2 | 34.6 | −73.2 | 127.1 | 3.835 | −16.8 | 106.8 | 487.6 | |
| 8.89 | 90.0 | 29.5 | 30.8 | −73.2 | 127.1 | 4.318 | −16.8 | 106.8 | 548.8 | *42 |
| 8.0 | 100.0 | 26.5 | 27.7 | −73.2 | 127.1 | 4.793 | −16.8 | 106.8 | 609.4 | |
| 6.7 | 120.0 | 22.1 | 23.1 | −73.2 | 127.1 | 5.752 | −16.8 | 106.8 | 731.3 | |
| 5.7 | 140.0 | 21.7 | 22.4 | −73.2 | 127.1 | 5.930 | −16.8 | 106.8 | 754.0 | |
| 5.0 | 160.0 | 16.6 | 17.3 | −73.2 | 127.1 | 7.669 | −16.8 | 106.8 | 975.1 | |
| 4.0 | 200.0 | 13.3 | 13.8 | −73.2 | 127.1 | 9.587 | −16.8 | 106.8 | 1,218.5 | |

Notes:
*42 This injected current Id of 4.32 amperes at Θ of 106.8 degrees from 90 microfarads is similar to the injected current Ia in Table I for FIG. 3 of 4.31 amperes at Θ of 108.5 degrees from 75 microfarads. These produce approximately the same starting torque.

The voltage across the PTC ambient-temperature resistance RD is 38.5 volts for all of the entries in TABLE VII.

Figure 14:
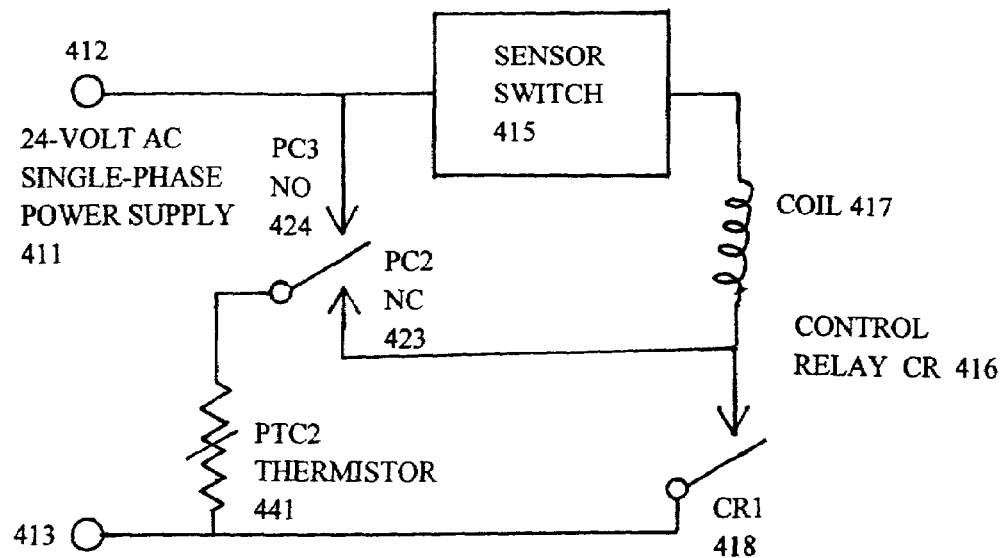
FIG. 14 is a circuit for use in the apparatus of the present invention showing thermal feedback control of the restart after turn-off of the apparatus.
Figure 14:
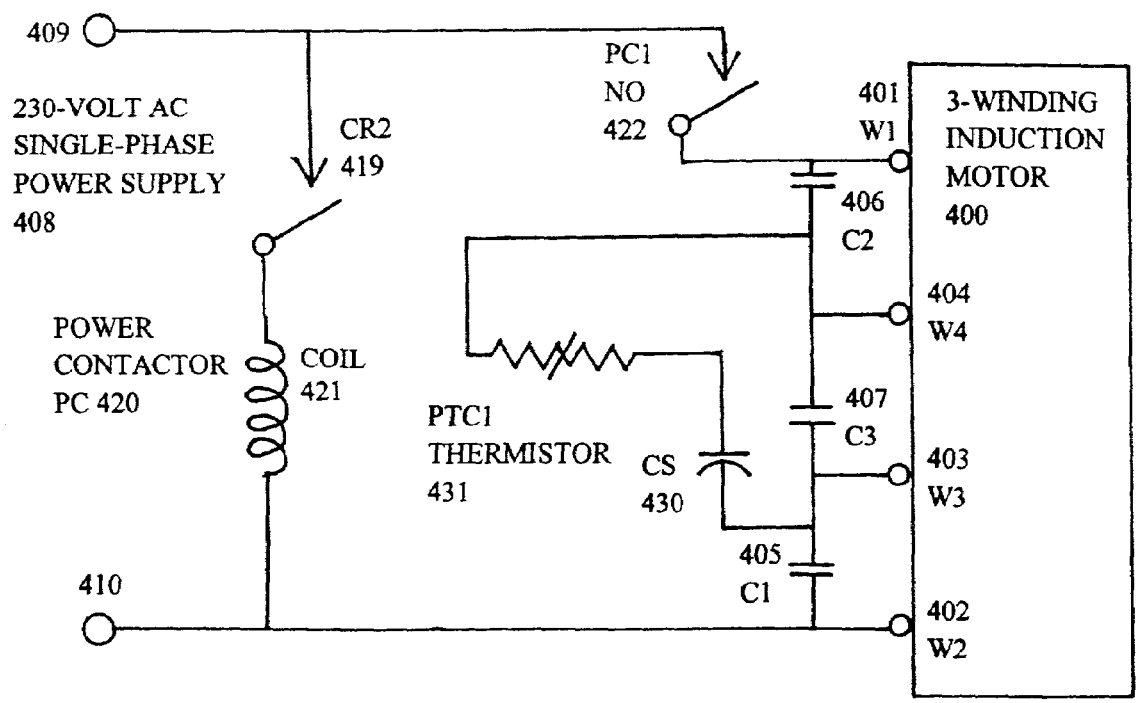

In FIG. 14, the three-winding induction machine 400 has four terminals of the three windings brought out. Electrical terminals 401, 402, 403, and 404 have also been denoted the winding terminals W1, W2, W3, and W4 respectively. At least one motor run capacitor is connected between two of these terminals. Shown in the figure are run capacitor 405 connected between winding terminals 402 and 403, a second run capacitor 406 connected between winding terminals 401 and 404, and a third run capacitor 407 connected between winding terminal 403 and 404.

A 230-volt single-phase alternating-current power supply 408 is shown with terminals 409 and 410. A 24-volt single-phase alternating-current power supply 411 is shown with terminals 412 and 413. A control component is a sensor switch 415. There is a control relay 416 denoted CR with a coil 417 and several sets of contacts 418 and 419. There is a power contactor 420 denoted PC with a coil 421 and several sets of contacts 422, 423, and 424.

The 24-volt system is a series connection of the sensor switch 415 and the control-relay coil 417 and the control-relay normally-open contacts 418 between supply terminals 412 and 413.

The 230-volt system has across the power supply terminals 409 and 410 the series connection of the power-contactor coil 421 and normally-open control-relay contacts 419. Supply terminal 410 is connected to winding terminal 402. Supply terminal 409 is connected to winding terminal 401 through the normally-open contacts 422 of the said power contactor 420.

The augmented-starting-torque circuit is the connection of an electrolytic starting capacitor 430 in series with a Positive-Temperature-Coefficient PTC Thermistor 431 between winding terminals 403 and 404.

The feedback circuit is shown as a single-pole double-throw pair of contacts, which are the auxiliary NC contacts 423 and the auxiliary NO contacts 424 of the power contactor 420. The connection to the "single-pole" armature of this pair of contacts is 440. A second PTC Thermistor 441 is connected between 440 and the supply terminal 413. When the thermistor 441 is at ambient temperature, or "cold", the electrical resistance is low or negligible. When the motor has not been operating, the power contactor 420 is unenergized, and the state of NC contacts 423 is closed, and the state of NO contacts 424 is open.

The Sensor Switch 415 can be an air-conditioner thermostat which closes an electrical circuit when the temperature rise is sensed. Switch 415 can alternatively be a heat-pump thermostat which closes an electrical circuit when the temperature decrease is sensed. Switch 415 can alternatively be an air-compressor pressure gauge which closes an electrical circuit when a pressure reduction is sensed. Switch 415 can alternatively be a sump-pump level gauge which closes an electrical circuit when the liquid level rises. When switch 415 closes, and the thermistor 441 is conducting, the 24 volts across the coil 417 causes the relay 416 to "pull-up", and close the normally-open contacts 418. This is a "lock-up" operation.

Control-relay normally-open contacts 419 close, energizing the coil 421 with 230-volts a-c. The power contactor 420 then "pulls-up". This closes NO power contacts 422 and delivers 230 volts to the motor terminals 401 and 402. The motor starts and runs as previously described. The motor starting utilizes the 431 PTC1 to augment the torque until the 431 PTC1 heats up and becomes a very high resistance. The 431 PTC is a very high resistance while the motor is running.

While the motor is running, NC contacts 423 are open, and NO contacts 424 are closed. The latter connects the 24 volts directly across the 441 PTC2. This 441 PTC2 heats up and becomes a high resistance.

When the sensor switch 415 opens, control relay 416 falls back, and contacts 418 and 419 open. Contactor 420 opens the contacts 422, and the motor stops. Thermistor 431 is hot, and "remembers" that the motor was recently running. It can now cool down to a "warm" resistance. Thermistor 441 is also hot, and also "remembers" that the motor was recently running. Thermistor 441 cools down to a "warm" resistance value, or down to an "ambient-temperature" resistance value. When both thermistors are "cool", the motor can be restarted as described above.

If a restart is attempted immediately after the motor has been de-energized, and both thermistors are "hot" and high resistance, the electrical circuit through switch 415, coil 417, contacts 423, and PTC 441 will have high resistance, and the 24 volts will be across the PTC 441 and not across the coil 417. The motor can not be started until after the time delay for the thermistor 441 to return to low resistance at a low temperature.

This circuit prevents the motor from starting until PTC 431 has also returned to low resistance at low temperature. For satisfactory operation, the thermal time constant of 441 should be equal to or longer than the thermal time constant of 431. This can be accomplished by the selection of the thermistors and/or the mounting to a heat sink or heat dissipation vane. Commercial items available at 250 vac range between 10 ohms and 70 ohms for a single thermistor. Commercial items available at 30 vac range between 0.4 ohms and 13 ohms.

This circuit in FIG. 14 is beneficial to prevent the manual over-ride of the normal dead-zone of a thermostat.

The motor in FIG. 14 can be the same as the motor in FIG. 7. The correspondence is given in Table VIII.

TABLE VIII

CORRESPONDENCE USING A
SEMI-HEX MOTOR CONNECTION.

| FIG. 7 | FIG. 14 |
|---|---|
| 211 | 401 |
| 213 | 404 |
| 212 | 403 |
| 214 | 402 |
| 227 | 410 |
| 203 | 409 |
| 204 | 422 |
| 231 | 430 |
| 225 | 431 |
| 217 | 405 |
| 230 | 407 |
| 229 | 406 |

FIG. 14 can use any motor winding connection, for example, the WYE connection in FIG. 3 or the DELTA connection in FIG. 4.

In view of the foregoing it can be seen that there has been provided an apparatus and method for driving a three-phase compressor assembly from a single-phase electrical power supply in which the compressor is provided with first, second and third windings. The apparatus includes a starting torque augmentation circuit which is utilized for injecting current into at least one of the windings which includes a capacitor and an electrical component in series with the capacitor to make starting of the three-phase compressor from a single-phase source of power by simply and inexpensively providing a low power factor load on the single-phase power supply. The electrical component has resistive characteristics and has means for essentially interrupting the current being injected into the third terminal after reaching the run condition for the compressor assembly. The capabilities of the starting torque augmentation circuit are such that the injected current is sufficient to re-start the compressor even upon reverse rotation of the compressor because of back pressure.

As also hereinbefore explained, the apparatus and method of the present invention is applicable to the three windings having different connections as for example wye, delta and star arrangements.

What is claimed:

1. A compressor with motive power provided by an induction motor having at least three windings, and a torque-augmentation circuit comprising a starting capacitor and a resistive element connected electrically in series between two of the motor winding terminals, the compressor further including:

a rotatable shaft, a gas source, a gas receiver, a single-phase electrical source with first and second supply lines, means connecting the motor windings in a closed delta configuration with first, second, and third delta corner terminals, first piping means to connect said gas source to the inlet suction port, second piping means to connect the outlet pressure port to the gas receiver, the rotatable shaft driven by the shaft of the induction motor, the single-phase electrical source first supply line connected through a switch to a power source terminal electrically connected to the first delta corner, the single-phase electrical source second supply line connected to the second delta corner, a torque augmentation circuit with first and second starting terminals consisting of a starting capacitor in series with an electrical component with conductance or resistance, a first starting terminal connecting said electrical component to one pole of an electrically-conductive connection means, the other pole of said electrically conductive connection means connected to the third delta corner terminal, a second starting terminal being the terminal of the starting capacitor not connected to the electrical component, means to connect said second starting terminal to the power source, and a static enabler means containing a motor-run capacitor connected between the power source and the third delta corner terminal, an autotransformer with first and second terminals and one winding tap intermediate between the first and second terminals, a connection of the first terminal of the autotransformer to the second supply line, a connection of the second terminal of the autotransformer to the third delta corner terminal, and an additional run capacitor connected between the winding tap and the power source terminal.

2. A compressor as in claim 1, wherein said electrical component is a positive-temperature-coefficient PTC thermistor.

3. A compressor as in claim 1, wherein said electrical component is the conductance between two terminals of a semiconductor device.

4. A compressor as in claim 1, wherein said electrical component is a fixed resistor and wherein said electrically-conductive connection means is a controllable electromechanical switch.

5. A compressor as in claim 1, wherein said gas source is a heat-pump evaporator and wherein said gas receiver is a heat-pump condenser.

6. A compressor as in claim 1, wherein said gas source is the atmospheric air, and wherein said gas receiver is a compressed-air storage tank.

7. A compressor as in claim 1, including a switch in the power supply, such that with the switch closed, the motor shaft would rotate normally in the desired direction of rotation, and such that with the switch opened and the motor unenergized, the high-pressure gas in the gas receiver might drive the compressor and its shaft backwards, and upon reclosing the switch with the shaft rotating backwards, the torque augmentation circuit will produce sufficient positive torque to stop the shaft negative velocity and cause the shaft to rotate normally in the desired direction.

* * * * *